(12) United States Patent
Komatsu et al.

(10) Patent No.: US 8,326,518 B2
(45) Date of Patent: Dec. 4, 2012

(54) KNOCKING DETECTING APPARATUS FOR INTERNAL COMBUSTION ENGINE

(75) Inventors: Hirotaka Komatsu, Wako (JP); Jiro Takagi, Wako (JP); Atsushi Kurauchi, Wako (JP); Masayuki Yoshiiri, Wako (JP); Kazuhiko Hirota, Wako (JP); Natsuko Kitamura, Wako (JP); Yoshiaki Akimoto, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 468 days.

(21) Appl. No.: 12/674,577

(22) PCT Filed: Mar. 9, 2009

(86) PCT No.: PCT/JP2009/054379
§ 371 (c)(1),
(2), (4) Date: Feb. 22, 2010

(87) PCT Pub. No.: WO2009/116410
PCT Pub. Date: Sep. 24, 2009

(65) Prior Publication Data
US 2011/0118960 A1      May 19, 2011

(30) Foreign Application Priority Data

Mar. 18, 2008   (JP) .................................. 2008-69019
Jan. 30, 2009   (JP) .................................. 2009-19354

(51) Int. Cl.
G06F 19/00         (2006.01)
G01L 23/22         (2006.01)
(52) U.S. Cl. ...................................... 701/111; 73/35.06
(58) Field of Classification Search ............. 123/406.16, 123/406.21, 406.24, 406.27, 406.29, 435; 701/111, 115; 73/35.03, 35.04, 35.05, 35.06, 73/114.02, 114.07
See application file for complete search history.

(56) References Cited

U.S. PATENT DOCUMENTS

| 4,164,867 A | * | 8/1979 | Hickling et al. | 374/117 |
| 4,356,551 A | * | 10/1982 | Iwase et al. | 701/111 |
| 4,467,634 A | * | 8/1984 | Rohde et al. | 73/35.03 |
| 4,489,692 A | * | 12/1984 | Haraguchi et al. | 123/406.36 |
| 4,593,553 A | * | 6/1986 | Bonitz et al. | 73/35.04 |

(Continued)

FOREIGN PATENT DOCUMENTS

JP        03-047449       2/1991

(Continued)

OTHER PUBLICATIONS

European Search Report application No. EP 09723209 dated Nov. 4, 2010.

*Primary Examiner* — Thomas Moulis
(74) *Attorney, Agent, or Firm* — Squire Sanders (US) LLP

(57) ABSTRACT

A knocking detecting apparatus for an internal combustion engine, which can more accurately perform the knocking determination based on frequency components of the output signal of the knock sensor, is provided. A frequency spectrum analysis of the knock sensor output signal is performed at predetermined angular intervals of the crankshaft rotation angle. Intensities of a plurality of frequency components obtained by the frequency spectrum analysis are stored as time series data. The time series data of the frequency component intensity are binarized, and it is determined whether or not a knocking has occurred based on the binarized time series data.

27 Claims, 27 Drawing Sheets

U.S. PATENT DOCUMENTS

| | | | |
|---|---|---|---|
| 4,715,184 A * | 12/1987 | Oosawa et al. | 60/602 |
| 4,829,956 A * | 5/1989 | Rehn et al. | 123/198 DB |
| 4,899,710 A * | 2/1990 | Takahashi | 123/406.35 |
| 5,400,644 A * | 3/1995 | Remboski et al. | 73/35.04 |
| 5,560,337 A * | 10/1996 | Bolander et al. | 123/406.33 |
| 5,598,822 A * | 2/1997 | Fujishita et al. | 123/406.38 |
| 6,060,913 A * | 5/2000 | Vulih et al. | 327/91 |
| 7,533,559 B2 * | 5/2009 | Goto | 73/35.09 |
| 7,769,536 B2 * | 8/2010 | Hamama et al. | 701/111 |
| 8,046,155 B2 * | 10/2011 | Saunders | 701/111 |
| 8,108,131 B2 * | 1/2012 | Huang et al. | 701/110 |

FOREIGN PATENT DOCUMENTS

| | | |
|---|---|---|
| JP | 04-043924 | 2/1992 |
| JP | 04-086531 | 3/1992 |
| JP | 2684611 | 8/1997 |
| JP | 11-303673 | 11/1999 |
| JP | 2002-296150 | 10/2002 |
| JP | 2002-296150 A | 10/2002 |
| JP | 2005-188297 | 7/2005 |
| JP | 2005-188297 A | 7/2005 |
| JP | 2006-307709 | 11/2006 |
| JP | 2007-247502 | 9/2007 |

* cited by examiner

[FIG. 1]
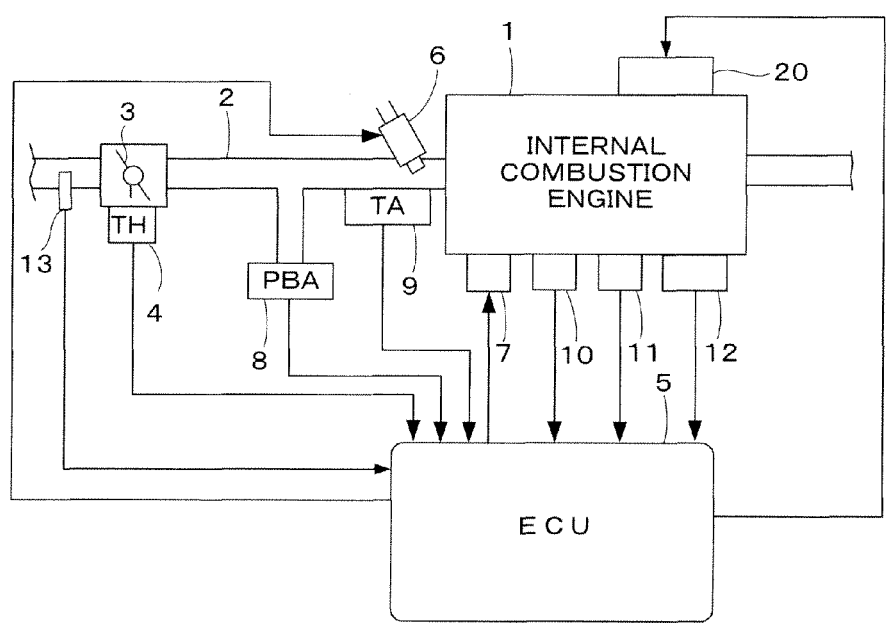

[FIG. 2]
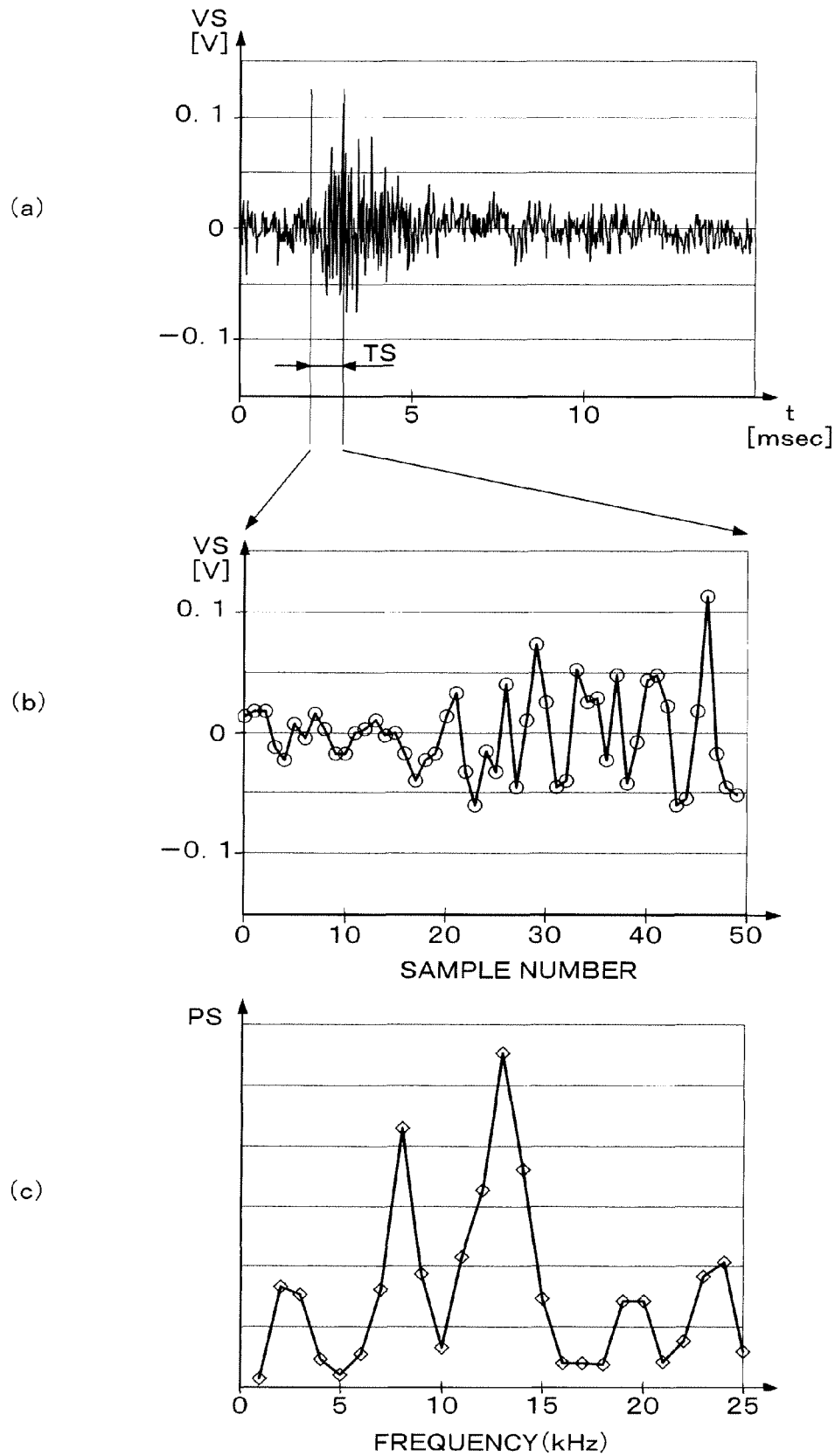

| FREQUENCY \ CRANK ANGLE | 6 | 12 | 18 | 24 | 30 | 36 | 42 | 48 | 54 | 60 | 66 | 72 | 78 | 84 | 90 |
|---|---|---|---|---|---|---|---|---|---|---|---|---|---|---|---|
| 25 | 56 | 56 | 24 | 30 | 24 | 26 | 26 | 26 | 26 | 26 | 30 | 30 | 44 | 44 | 30 |
| 24 | 66 | 66 | 24 | 44 | 24 | 24 | 44 | 24 | 24 | 24 | 44 | 44 | 43 | 43 | 44 |
| 23 | 78 | 78 | 52 | 43 | 34 | 24 | 43 | 24 | 34 | 24 | 43 | 43 | 41 | 44 | 43 |
| 22 | 67 | 67 | 67 | 41 | 43 | 43 | 41 | 34 | 35 | 34 | 24 | 41 | 30 | 43 | 41 |
| 21 | 80 | 80 | 66 | 66 | 41 | 43 | 30 | 35 | 36 | 35 | 24 | 24 | 24 | 41 | 30 |
| 20 | 77 | 77 | 43 | 60 | 56 | 41 | 43 | 36 | 43 | 36 | 34 | 24 | 24 | 30 | 24 |
| 19 | 66 | 66 | 41 | 43 | 67 | 53 | 41 | 43 | 32 | 43 | 35 | 34 | 34 | 24 | 24 |
| 18 | 56 | 56 | 43 | 41 | 43 | 53 | 34 | 43 | 31 | 32 | 36 | 35 | 35 | 24 | 34 |
| 17 | 60 | 60 | 60 | 60 | 41 | 52 | 52 | 41 | 25 | 31 | 43 | 36 | 36 | 34 | 35 |
| 16 | 64 | 64 | 66 | 66 | 60 | 43 | 51 | 51 | 43 | 25 | 32 | 43 | 43 | 35 | 36 |
| 15 | 62 | 62 | 43 | 32 | 64 | 56 | 43 | 51 | 34 | 43 | 31 | 32 | 32 | 36 | 43 |
| 14 | 60 | 60 | 41 | 32 | 43 | 56 | 56 | 51 | 52 | 34 | 25 | 31 | 31 | 43 | 32 |
| 13 | 58 | 58 | 56 | 43 | 41 | 43 | 54 | 51 | 50 | 43 | 43 | 25 | 25 | 32 | 31 |
| 12 | 66 | 66 | 57 | 60 | 32 | 41 | 43 | 43 | 53 | 52 | 34 | 43 | 43 | 31 | 25 |
| 11 | 76 | 76 | 62 | 62 | 67 | 32 | 41 | 41 | 43 | 51 | 52 | 34 | 34 | 25 | 43 |
| 10 | 66 | 66 | 43 | 43 | 56 | 65 | 67 | 32 | 41 | 50 | 51 | 43 | 43 | 43 | 34 |
| 9 | 57 | 57 | 43 | 41 | 43 | 64 | 64 | 56 | 32 | 32 | 50 | 51 | 40 | 34 | 43 |
| 8 | 53 | 53 | 41 | 41 | 41 | 32 | 67 | 55 | 53 | 32 | 50 | 51 | 51 | 43 | 40 |
| 7 | 66 | 66 | 75 | 68 | 70 | 68 | 69 | 70 | 67 | 66 | 63 | 64 | 62 | 52 | 38 |
| 6 | 76 | 76 | 75 | 68 | 70 | 68 | 69 | 70 | 67 | 66 | 63 | 64 | 62 | 60 | 60 |
| 5 | 34 | 35 | 30 | 44 | 43 | 41 | 30 | 24 | 24 | 34 | 35 | 36 | 43 | 32 | 31 |

(b)

| FREQUENCY \ CRANK ANGLE | 6 | 12 | 18 | 24 | 30 | 36 | 42 | 48 | 54 | 60 | 66 | 72 | 78 | 84 | 90 |
|---|---|---|---|---|---|---|---|---|---|---|---|---|---|---|---|
| 25 | 1 | 1 | 0 | 0 | 0 | 0 | 0 | 0 | 0 | 0 | 0 | 0 | 0 | 0 | 0 |
| 24 | 1 | 1 | 0 | 0 | 0 | 0 | 0 | 0 | 0 | 0 | 0 | 0 | 0 | 0 | 0 |
| 23 | 1 | 1 | 1 | 0 | 0 | 0 | 0 | 0 | 0 | 0 | 0 | 0 | 0 | 0 | 0 |
| 22 | 1 | 1 | 1 | 0 | 0 | 0 | 0 | 0 | 0 | 0 | 0 | 0 | 0 | 0 | 0 |
| 21 | 1 | 1 | 1 | 1 | 0 | 0 | 0 | 0 | 0 | 0 | 0 | 0 | 0 | 0 | 0 |
| 20 | 1 | 1 | 0 | 1 | 1 | 0 | 0 | 0 | 0 | 0 | 0 | 0 | 0 | 0 | 0 |
| 19 | 1 | 1 | 0 | 0 | 1 | 1 | 0 | 0 | 0 | 0 | 0 | 0 | 0 | 0 | 0 |
| 18 | 1 | 1 | 0 | 0 | 0 | 1 | 1 | 0 | 0 | 0 | 0 | 0 | 0 | 0 | 0 |
| 17 | 1 | 1 | 1 | 1 | 0 | 1 | 1 | 0 | 0 | 0 | 0 | 0 | 0 | 0 | 0 |
| 16 | 1 | 1 | 1 | 1 | 1 | 0 | 1 | 1 | 0 | 0 | 0 | 0 | 0 | 0 | 0 |
| 15 | 1 | 1 | 0 | 0 | 1 | 1 | 0 | 1 | 1 | 0 | 0 | 0 | 0 | 0 | 0 |
| 14 | 1 | 1 | 0 | 0 | 0 | 1 | 1 | 1 | 1 | 0 | 0 | 0 | 0 | 0 | 0 |
| 13 | 1 | 1 | 1 | 0 | 0 | 0 | 1 | 1 | 1 | 0 | 0 | 0 | 0 | 0 | 0 |
| 12 | 1 | 1 | 1 | 1 | 0 | 0 | 0 | 0 | 1 | 1 | 0 | 0 | 0 | 0 | 0 |
| 11 | 1 | 1 | 1 | 1 | 1 | 0 | 0 | 0 | 0 | 1 | 1 | 0 | 0 | 0 | 0 |
| 10 | 1 | 1 | 0 | 0 | 1 | 1 | 1 | 0 | 0 | 1 | 1 | 0 | 0 | 0 | 0 |
| 9 | 1 | 1 | 0 | 0 | 0 | 1 | 1 | 1 | 0 | 0 | 1 | 1 | 0 | 0 | 0 |
| 8 | 1 | 1 | 0 | 0 | 0 | 0 | 1 | 1 | 1 | 0 | 1 | 1 | 1 | 0 | 0 |
| 7 | 1 | 1 | 1 | 1 | 1 | 1 | 1 | 1 | 1 | 1 | 1 | 1 | 1 | 1 | 0 |
| 6 | 1 | 1 | 1 | 1 | 1 | 1 | 1 | 1 | 1 | 1 | 1 | 1 | 1 | 1 | 1 |
| 5 | 0 | 0 | 0 | 0 | 0 | 0 | 0 | 0 | 0 | 0 | 0 | 0 | 0 | 0 | 0 |

[FIG. 4]

| | | \multicolumn{15}{c|}{CRANK ANGLE} | | | | | | | | | | | | | |
|---|---|---|---|---|---|---|---|---|---|---|---|---|---|---|---|
| | | 6 | 12 | 18 | 24 | 30 | 36 | 42 | 48 | 54 | 60 | 66 | 72 | 78 | 84 | 90 |
| FREQUENCY | 25 | 1 | 0 | 0 | 0 | 0 | 0 | 0 | 1 | 0 | 0 | 0 | 0 | 0 | 0 | 0 |
| | 24 | 1 | 0 | 0 | 0 | 0 | 0 | 0 | 1 | 0 | 0 | 0 | 0 | 0 | 0 | 0 |
| | 23 | 1 | 0 | 0 | 0 | 0 | 0 | 0 | 1 | 0 | 0 | 0 | 0 | 0 | 0 | 0 |
| | 22 | 1 | 0 | 0 | 0 | 0 | 0 | 0 | 1 | 0 | 0 | 0 | 0 | 0 | 0 | 0 |
| | 21 | 1 | 0 | 0 | 0 | 0 | 0 | 0 | 1 | 0 | 0 | 0 | 0 | 0 | 0 | 0 |
| | 20 | 1 | 0 | 0 | 0 | 0 | 0 | 0 | 1 | 0 | 0 | 0 | 0 | 0 | 0 | 0 |
| | 19 | 1 | 0 | 0 | 0 | 0 | 0 | 0 | 1 | 0 | 0 | 0 | 0 | 0 | 0 | 0 |
| | 18 | 1 | 0 | 0 | 0 | 0 | 0 | 0 | 1 | 0 | 0 | 0 | 0 | 0 | 0 | 0 |
| | 17 | 1 | 0 | 0 | 0 | 0 | 0 | 0 | 1 | 0 | 0 | 0 | 0 | 0 | 0 | 0 |
| | 16 | 1 | 0 | 0 | 0 | 0 | 0 | 0 | 1 | 0 | 0 | 0 | 0 | 0 | 0 | 0 |
| | 15 | 1 | 0 | 0 | 0 | 0 | 0 | 0 | 1 | 0 | 0 | 0 | 0 | 0 | 0 | 0 |
| | 14 | 1 | 0 | 0 | 0 | 0 | 0 | 0 | 1 | 0 | 0 | 0 | 0 | 0 | 0 | 0 |
| | 13 | 1 | 0 | 0 | 0 | 0 | 0 | 0 | 1 | 0 | 0 | 0 | 0 | 0 | 0 | 0 |
| | 12 | 1 | 0 | 0 | 0 | 0 | 0 | 0 | 1 | 0 | 0 | 0 | 0 | 0 | 0 | 0 |
| | 11 | 1 | 0 | 0 | 0 | 0 | 0 | 0 | 1 | 0 | 0 | 0 | 0 | 0 | 0 | 0 |
| | 10 | 1 | 0 | 0 | 0 | 0 | 0 | 0 | 1 | 0 | 0 | 0 | 0 | 0 | 0 | 0 |
| | 9 | 1 | 0 | 0 | 0 | 0 | 0 | 0 | 1 | 0 | 0 | 0 | 0 | 0 | 0 | 0 |
| | 8 | 1 | 0 | 0 | 0 | 0 | 0 | 0 | 1 | 0 | 0 | 0 | 0 | 0 | 0 | 0 |
| | 7 | 1 | 0 | 0 | 0 | 0 | 0 | 0 | 1 | 0 | 0 | 0 | 0 | 0 | 0 | 0 |
| | 6 | 1 | 0 | 0 | 0 | 0 | 0 | 0 | 1 | 0 | 0 | 0 | 0 | 0 | 0 | 0 |
| | 5 | 0 | 0 | 0 | 0 | 0 | 0 | 0 | 0 | 0 | 0 | 0 | 0 | 0 | 0 | 0 |

| FREQUENCY \ CRANK ANGLE | 6 | 12 | 18 | 24 | 30 | 36 | 42 | 48 | 54 | 60 | 66 | 72 | 78 | 84 | 90 |
|---|---|---|---|---|---|---|---|---|---|---|---|---|---|---|---|
| 25 | 1 | 0 | 0 | 0 | 0 | 0 | 0 | 0 | 0 | 0 | 0 | 0 | 0 | 0 | 0 |
| 24 | 1 | 0 | 0 | 0 | 0 | 0 | 0 | 0 | 0 | 0 | 0 | 0 | 0 | 0 | 0 |
| 23 | 1 | 0 | 0 | 0 | 0 | 0 | 0 | 0 | 0 | 0 | 0 | 0 | 0 | 0 | 0 |
| 22 | 1 | 0 | 0 | 0 | 0 | 0 | 0 | 0 | 0 | 0 | 0 | 0 | 0 | 0 | 0 |
| 21 | 1 | 0 | 0 | 0 | 0 | 0 | 0 | 0 | 0 | 0 | 0 | 0 | 0 | 0 | 0 |
| 20 | 1 | 0 | 0 | 0 | 0 | 0 | 0 | 0 | 0 | 0 | 0 | 0 | 0 | 0 | 0 |
| 19 | 1 | 0 | 0 | 0 | 0 | 0 | 0 | 0 | 0 | 0 | 0 | 0 | 0 | 0 | 0 |
| 18 | 1 | 0 | 0 | 0 | 0 | 0 | 0 | 0 | 0 | 0 | 0 | 0 | 0 | 0 | 0 |
| 17 | 1 | 0 | 0 | 0 | 0 | 0 | 0 | 0 | 0 | 0 | 0 | 0 | 0 | 0 | 0 |
| 16 | 1 | 0 | 0 | 0 | 0 | 0 | 0 | 0 | 0 | 0 | 0 | 0 | 0 | 0 | 0 |
| 15 | 1 | 0 | 0 | 0 | 0 | 0 | 0 | 0 | 0 | 0 | 0 | 0 | 0 | 0 | 0 |
| 14 | 1 | 0 | 0 | 0 | 0 | 0 | 0 | 0 | 0 | 0 | 0 | 0 | 0 | 0 | 0 |
| 13 | 1 | 0 | 0 | 0 | 0 | 0 | 0 | 0 | 0 | 0 | 0 | 0 | 0 | 0 | 0 |
| 12 | 1 | 0 | 0 | 0 | 0 | 0 | 0 | 0 | 0 | 0 | 0 | 0 | 0 | 0 | 0 |
| 11 | 1 | 0 | 0 | 0 | 0 | 0 | 0 | 0 | 0 | 0 | 0 | 0 | 0 | 0 | 0 |
| 10 | 1 | 0 | 0 | 0 | 0 | 0 | 0 | 0 | 0 | 0 | 0 | 0 | 0 | 0 | 0 |
| 9 | 1 | 0 | 0 | 0 | 0 | 0 | 0 | 0 | 0 | 0 | 0 | 0 | 0 | 0 | 0 |
| 8 | 1 | 0 | 0 | 0 | 0 | 0 | 0 | 0 | 0 | 0 | 0 | 0 | 0 | 0 | 0 |
| 7 | 1 | 0 | 0 | 0 | 0 | 0 | 0 | 0 | 0 | 0 | 0 | 0 | 0 | 0 | 0 |
| 6 | 1 | 0 | 0 | 0 | 0 | 0 | 0 | 0 | 0 | 0 | 0 | 0 | 0 | 0 | 0 |
| 5 | 0 | 0 | 0 | 0 | 0 | 0 | 0 | 0 | 0 | 0 | 0 | 0 | 0 | 0 | 0 |

(b)

| FREQUENCY \ CRANK ANGLE | 6 | 12 | 18 | 24 | 30 | 36 | 42 | 48 | 54 | 60 | 66 | 72 | 78 | 84 | 90 |
|---|---|---|---|---|---|---|---|---|---|---|---|---|---|---|---|
| 25 | 0 | 1 | 0 | 0 | 0 | 0 | 0 | 0 | 0 | 0 | 0 | 0 | 0 | 0 | 0 |
| 24 | 0 | 1 | 0 | 0 | 0 | 0 | 0 | 0 | 0 | 0 | 0 | 0 | 0 | 0 | 0 |
| 23 | 0 | 1 | 1 | 0 | 0 | 0 | 0 | 0 | 0 | 0 | 0 | 0 | 0 | 0 | 0 |
| 22 | 0 | 1 | 1 | 0 | 0 | 0 | 0 | 0 | 0 | 0 | 0 | 0 | 0 | 0 | 0 |
| 21 | 0 | 1 | 1 | 1 | 0 | 0 | 0 | 0 | 0 | 0 | 0 | 0 | 0 | 0 | 0 |
| 20 | 0 | 1 | 0 | 1 | 1 | 0 | 0 | 0 | 0 | 0 | 0 | 0 | 0 | 0 | 0 |
| 19 | 0 | 1 | 0 | 0 | 1 | 1 | 0 | 0 | 0 | 0 | 0 | 0 | 0 | 0 | 0 |
| 18 | 0 | 1 | 0 | 0 | 0 | 1 | 1 | 0 | 0 | 0 | 0 | 0 | 0 | 0 | 0 |
| 17 | 0 | 1 | 1 | 1 | 0 | 1 | 1 | 0 | 0 | 0 | 0 | 0 | 0 | 0 | 0 |
| 16 | 0 | 1 | 1 | 1 | 1 | 0 | 1 | 1 | 0 | 0 | 0 | 0 | 0 | 0 | 0 |
| 15 | 0 | 1 | 0 | 0 | 1 | 1 | 0 | 1 | 0 | 0 | 0 | 0 | 0 | 0 | 0 |
| 14 | 0 | 1 | 0 | 0 | 1 | 1 | 1 | 1 | 0 | 0 | 0 | 0 | 0 | 0 | 0 |
| 13 | 0 | 1 | 1 | 0 | 0 | 1 | 1 | 1 | 0 | 0 | 0 | 0 | 0 | 0 | 0 |
| 12 | 0 | 1 | 1 | 0 | 0 | 0 | 1 | 1 | 0 | 0 | 0 | 0 | 0 | 0 | 0 |
| 11 | 0 | 1 | 1 | 1 | 1 | 0 | 0 | 0 | 1 | 1 | 0 | 0 | 0 | 0 | 0 |
| 10 | 0 | 1 | 0 | 0 | 1 | 1 | 0 | 0 | 1 | 1 | 0 | 0 | 0 | 0 | 0 |
| 9 | 0 | 1 | 0 | 0 | 1 | 1 | 1 | 0 | 0 | 1 | 1 | 0 | 0 | 0 | 0 |
| 8 | 0 | 1 | 0 | 0 | 0 | 1 | 1 | 1 | 0 | 1 | 1 | 0 | 0 | 0 | 0 |
| 7 | 0 | 1 | 1 | 1 | 1 | 1 | 1 | 1 | 1 | 1 | 1 | 1 | 1 | 1 | 0 |
| 6 | 0 | 1 | 1 | 1 | 1 | 1 | 1 | 1 | 1 | 1 | 1 | 1 | 1 | 1 | 1 |
| 5 | 0 | 0 | 0 | 0 | 0 | 0 | 0 | 0 | 0 | 0 | 0 | 0 | 0 | 0 | 0 |

|  | CRANK ANGLE | | | | | | | | | | | | | | |
|---|---|---|---|---|---|---|---|---|---|---|---|---|---|---|---|
| FREQUENCY | 6 | 12 | 18 | 24 | 30 | 36 | 42 | 48 | 54 | 60 | 66 | 72 | 78 | 84 | 90 |
| 25 | 0 | 1 | 0 | 0 | 0 | 0 | 0 | 0 | 0 | 0 | 0 | 0 | 0 | 0 | 0 |
| 24 | 0 | 1 | 0 | 0 | 0 | 0 | 0 | 0 | 0 | 0 | 0 | 0 | 0 | 0 | 0 |
| 23 | 0 | 1 | 1 | 0 | 0 | 0 | 0 | 0 | 0 | 0 | 0 | 0 | 0 | 0 | 0 |
| 22 | 0 | 1 | 1 | 0 | 0 | 0 | 0 | 0 | 0 | 0 | 0 | 0 | 0 | 0 | 0 |
| 21 | 0 | 1 | 1 | 1 | 0 | 0 | 0 | 0 | 0 | 0 | 0 | 0 | 0 | 0 | 0 |
| 20 | 0 | 1 | 1 | 1 | 1 | 0 | 0 | 0 | 0 | 0 | 0 | 0 | 0 | 0 | 0 |
| 19 | 0 | 1 | 1 | 1 | 1 | 1 | 0 | 0 | 0 | 0 | 0 | 0 | 0 | 0 | 0 |
| 18 | 0 | 1 | 1 | 1 | 1 | 1 | 1 | 0 | 0 | 0 | 0 | 0 | 0 | 0 | 0 |
| 17 | 0 | 1 | 1 | 1 | 1 | 1 | 1 | 0 | 0 | 0 | 0 | 0 | 0 | 0 | 0 |
| 16 | 0 | 1 | 1 | 1 | 1 | 1 | 1 | 1 | 0 | 0 | 0 | 0 | 0 | 0 | 0 |
| 15 | 0 | 1 | 1 | 1 | 1 | 1 | 1 | 1 | 0 | 0 | 0 | 0 | 0 | 0 | 0 |
| 14 | 0 | 1 | 1 | 1 | 1 | 1 | 1 | 1 | 1 | 0 | 0 | 0 | 0 | 0 | 0 |
| 13 | 0 | 1 | 1 | 1 | 1 | 1 | 1 | 1 | 1 | 0 | 0 | 0 | 0 | 0 | 0 |
| 12 | 0 | 1 | 1 | 1 | 1 | 1 | 1 | 1 | 1 | 1 | 0 | 0 | 0 | 0 | 0 |
| 11 | 0 | 1 | 1 | 1 | 1 | 1 | 1 | 1 | 1 | 1 | 1 | 0 | 0 | 0 | 0 |
| 10 | 0 | 1 | 1 | 1 | 1 | 1 | 1 | 1 | 1 | 1 | 1 | 0 | 0 | 0 | 0 |
| 9 | 0 | 1 | 1 | 1 | 1 | 1 | 1 | 1 | 1 | 1 | 1 | 1 | 0 | 0 | 0 |
| 8 | 0 | 1 | 1 | 1 | 1 | 1 | 1 | 1 | 1 | 1 | 1 | 1 | 1 | 0 | 0 |
| 7 | 0 | 1 | 1 | 1 | 1 | 1 | 1 | 1 | 1 | 1 | 1 | 1 | 1 | 1 | 0 |
| 6 | 0 | 1 | 1 | 1 | 1 | 1 | 1 | 1 | 1 | 1 | 1 | 1 | 1 | 1 | 1 |
| 5 | 0 | 0 | 0 | 0 | 0 | 0 | 0 | 0 | 0 | 0 | 0 | 0 | 0 | 0 | 0 |

(b)

|  | CRANK ANGLE | | | | | | | | | | | | | | |
|---|---|---|---|---|---|---|---|---|---|---|---|---|---|---|---|
| FREQUENCY | 6 | 12 | 18 | 24 | 30 | 36 | 42 | 48 | 54 | 60 | 66 | 72 | 78 | 84 | 90 |
| 25 | 0 | 1 | 0 | 0 | 0 | 0 | 0 | 0 | 0 | 0 | 0 | 0 | 0 | 0 | 0 |
| 24 | 0 | 1 | 0 | 0 | 0 | 0 | 0 | 0 | 0 | 0 | 0 | 0 | 0 | 0 | 0 |
| 23 | 0 | 1 | 1 | 0 | 0 | 0 | 0 | 0 | 0 | 0 | 0 | 0 | 0 | 0 | 0 |
| 22 | 0 | 1 | 1 | 0 | 0 | 0 | 0 | 0 | 0 | 0 | 0 | 0 | 0 | 0 | 0 |
| 21 | 0 | 1 | 1 | 1 | 0 | 0 | 0 | 0 | 0 | 0 | 0 | 0 | 0 | 0 | 0 |
| 20 | 0 | 1 | 0 | 1 | 1 | 0 | 0 | 0 | 0 | 0 | 0 | 0 | 0 | 0 | 0 |
| 19 | 0 | 1 | 0 | 0 | 1 | 1 | 0 | 0 | 0 | 0 | 0 | 0 | 0 | 0 | 0 |
| 18 | 0 | 1 | 0 | 0 | 0 | 1 | 1 | 0 | 0 | 0 | 0 | 0 | 0 | 0 | 0 |
| 17 | 0 | 1 | 1 | 1 | 0 | 1 | 1 | 0 | 0 | 0 | 0 | 0 | 0 | 0 | 0 |
| 16 | 0 | 1 | 1 | 1 | 1 | 0 | 1 | 1 | 0 | 0 | 0 | 0 | 0 | 0 | 0 |
| 15 | 0 | 1 | 0 | 0 | 1 | 1 | 0 | 1 | 0 | 0 | 0 | 0 | 0 | 0 | 0 |
| 14 | 0 | 1 | 0 | 0 | 0 | 1 | 1 | 1 | 1 | 0 | 0 | 0 | 0 | 0 | 0 |
| 13 | 0 | 1 | 1 | 0 | 0 | 1 | 1 | 1 | 0 | 0 | 0 | 0 | 0 | 0 | 0 |
| 12 | 0 | 1 | 1 | 1 | 0 | 0 | 0 | 1 | 1 | 0 | 0 | 0 | 0 | 0 | 0 |
| 11 | 0 | 1 | 1 | 1 | 1 | 0 | 0 | 0 | 1 | 1 | 0 | 0 | 0 | 0 | 0 |
| 10 | 0 | 1 | 0 | 0 | 1 | 1 | 1 | 0 | 1 | 1 | 0 | 0 | 0 | 0 | 0 |
| 9 | 0 | 1 | 0 | 0 | 0 | 1 | 1 | 1 | 0 | 1 | 1 | 0 | 0 | 0 | 0 |
| 8 | 0 | 1 | 0 | 0 | 0 | 0 | 1 | 1 | 0 | 1 | 1 | 1 | 0 | 0 | 0 |
| 7 | 0 | 1 | 1 | 1 | 1 | 1 | 1 | 1 | 1 | 1 | 1 | 1 | 1 | 1 | 0 |
| 6 | 0 | 1 | 1 | 1 | 1 | 1 | 1 | 1 | 1 | 1 | 1 | 1 | 1 | 1 | 1 |
| 5 | 0 | 0 | 0 | 0 | 0 | 0 | 0 | 0 | 0 | 0 | 0 | 0 | 0 | 0 | 0 |

[FIG. 7]

|  | CRANK ANGLE | | | | | | | | | | | | | | |
|---|---|---|---|---|---|---|---|---|---|---|---|---|---|---|---|
| FREQUENCY | | 6 | 12 | 18 | 24 | 30 | 36 | 42 | 48 | 54 | 60 | 66 | 72 | 78 | 84 | 90 |
| | 25 | 1 | 1 | 1 | 1 | 1 | 1 | 1 | 1 | 1 | 1 | 1 | 1 | 1 | 1 | 1 |
| | 24 | 1 | 1 | 1 | 1 | 1 | 1 | 1 | 1 | 1 | 1 | 1 | 1 | 1 | 1 | 1 |
| | 23 | 1 | 1 | 1 | 1 | 1 | 1 | 1 | 1 | 1 | 1 | 1 | 1 | 1 | 1 | 1 |
| | 22 | 1 | 1 | 1 | 1 | 1 | 1 | 1 | 1 | 1 | 1 | 1 | 1 | 1 | 1 | 1 |
| | 21 | 1 | 1 | 1 | 1 | 1 | 1 | 1 | 1 | 1 | 1 | 1 | 1 | 1 | 1 | 1 |
| | 20 | 1 | 5 | 5 | 5 | 5 | 1 | 1 | 1 | 1 | 1 | 1 | 1 | 1 | 1 | 1 |
| | 19 | 1 | 1 | 1 | 1 | 1 | 1 | 1 | 1 | 1 | 1 | 1 | 1 | 1 | 1 | 1 |
| | 18 | 1 | 1 | 1 | 1 | 1 | 1 | 1 | 1 | 1 | 1 | 1 | 1 | 1 | 1 | 1 |
| | 17 | 1 | 1 | 1 | 1 | 1 | 1 | 1 | 1 | 1 | 1 | 1 | 1 | 1 | 1 | 1 |
| | 16 | 1 | 1 | 1 | 1 | 1 | 1 | 1 | 1 | 1 | 1 | 1 | 1 | 1 | 1 | 1 |
| | 15 | 1 | 5 | 5 | 5 | 5 | 1 | 1 | 1 | 1 | 1 | 1 | 1 | 1 | 1 | 1 |
| | 14 | 1 | 1 | 1 | 1 | 1 | 1 | 1 | 1 | 1 | 1 | 1 | 1 | 1 | 1 | 1 |
| | 13 | 1 | 5 | 5 | 5 | 5 | 1 | 1 | 1 | 1 | 1 | 1 | 1 | 1 | 1 | 1 |
| | 12 | 1 | 1 | 1 | 1 | 1 | 1 | 1 | 1 | 1 | 1 | 1 | 1 | 1 | 1 | 1 |
| | 11 | 1 | 5 | 5 | 5 | 5 | 1 | 1 | 1 | 1 | 1 | 1 | 1 | 1 | 1 | 1 |
| | 10 | 1 | 1 | 1 | 1 | 1 | 5 | 5 | 5 | 5 | 5 | 5 | 1 | 1 | 1 | 1 |
| | 9 | 1 | 1 | 1 | 1 | 1 | 1 | 1 | 1 | 1 | 1 | 1 | 1 | 1 | 1 | 1 |
| | 8 | 1 | 1 | 1 | 1 | 1 | 1 | 1 | 1 | 1 | 1 | 1 | 1 | 1 | 1 | 1 |
| | 7 | 1 | 1 | 1 | 1 | 1 | 1 | 1 | 1 | 1 | 1 | 1 | 1 | 1 | 1 | 1 |
| | 6 | 1 | 5 | 5 | 5 | 5 | 5 | 5 | 5 | 5 | 5 | 5 | 5 | 1 | 1 | 1 |
| | 5 | 1 | 1 | 1 | 1 | 1 | 1 | 1 | 1 | 1 | 1 | 1 | 1 | 1 | 1 | 1 |

[FIG. 8]
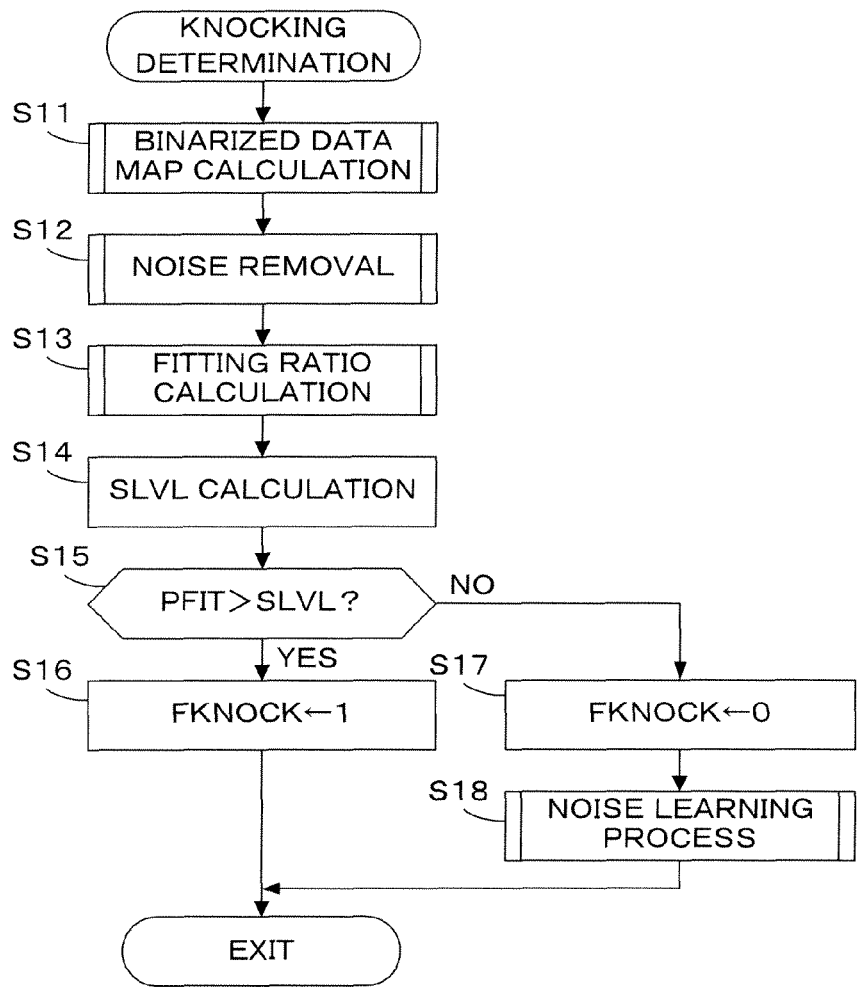
[FIG. 9]
|  |  | NE[rpm] | | | | | | |
| --- | --- | --- | --- | --- | --- | --- | --- | --- |
|  |  | 1000 | 2000 | 3000 | 4000 | 5000 | 6000 | 7000 |
| PBA [kPa] | 107 | 0.8 | 0.8 | 0.9 | 0.9 | 0.95 | 0.95 | 0.95 |
|  | 93 | 0.8 | 0.8 | 0.9 | 0.9 | 0.9 | 0.9 | 0.9 |
|  | 80 | 0.7 | 0.8 | 0.95 | 0.8 | 0.7 | 0.8 | 0.8 |
|  | 67 | 0.8 | 0.9 | 0.8 | 0.95 | 0.95 | 0.95 | 0.95 |
|  | 53 | 0.95 | 0.95 | 0.8 | 0.95 | 0.95 | 0.95 | 0.95 |

[FIG. 10]
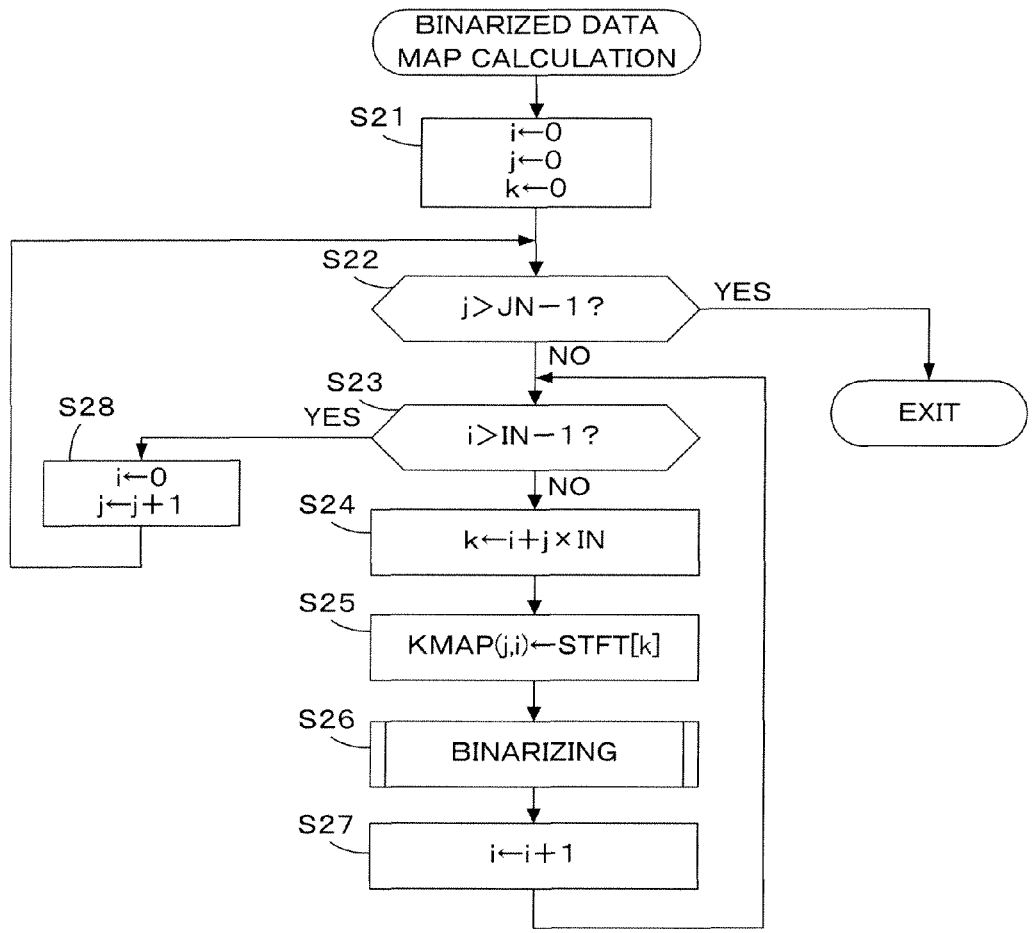
[FIG. 11]
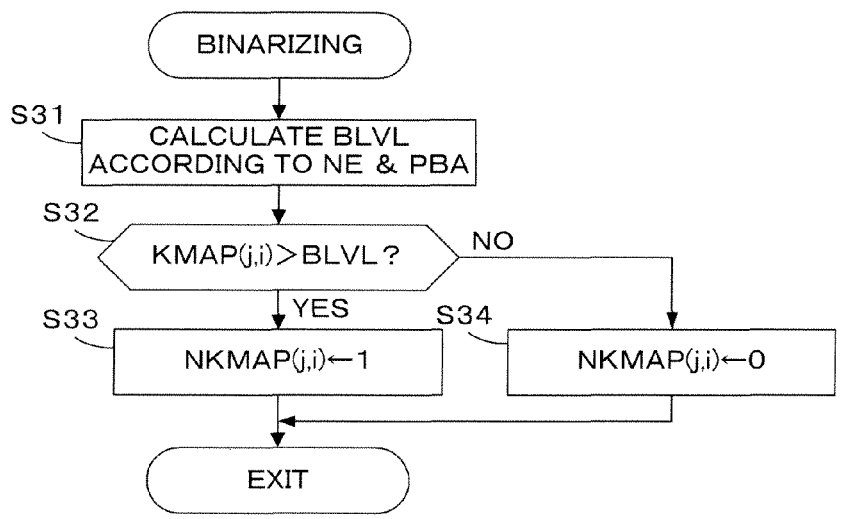

[FIG. 12]
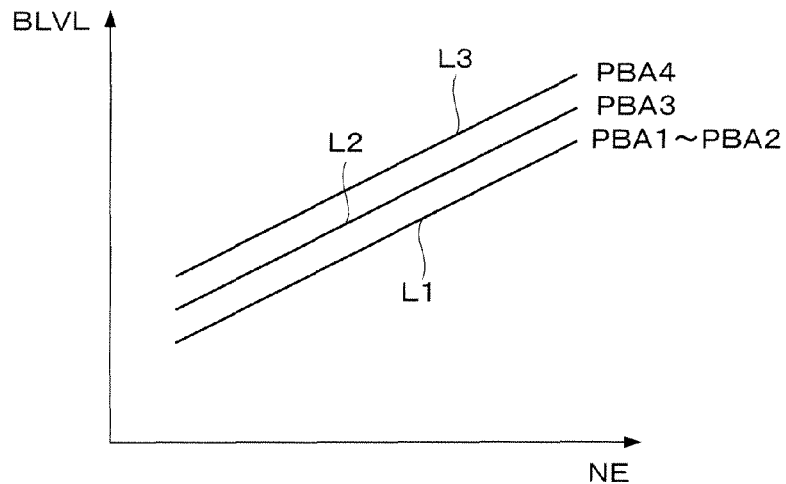
[FIG. 13]
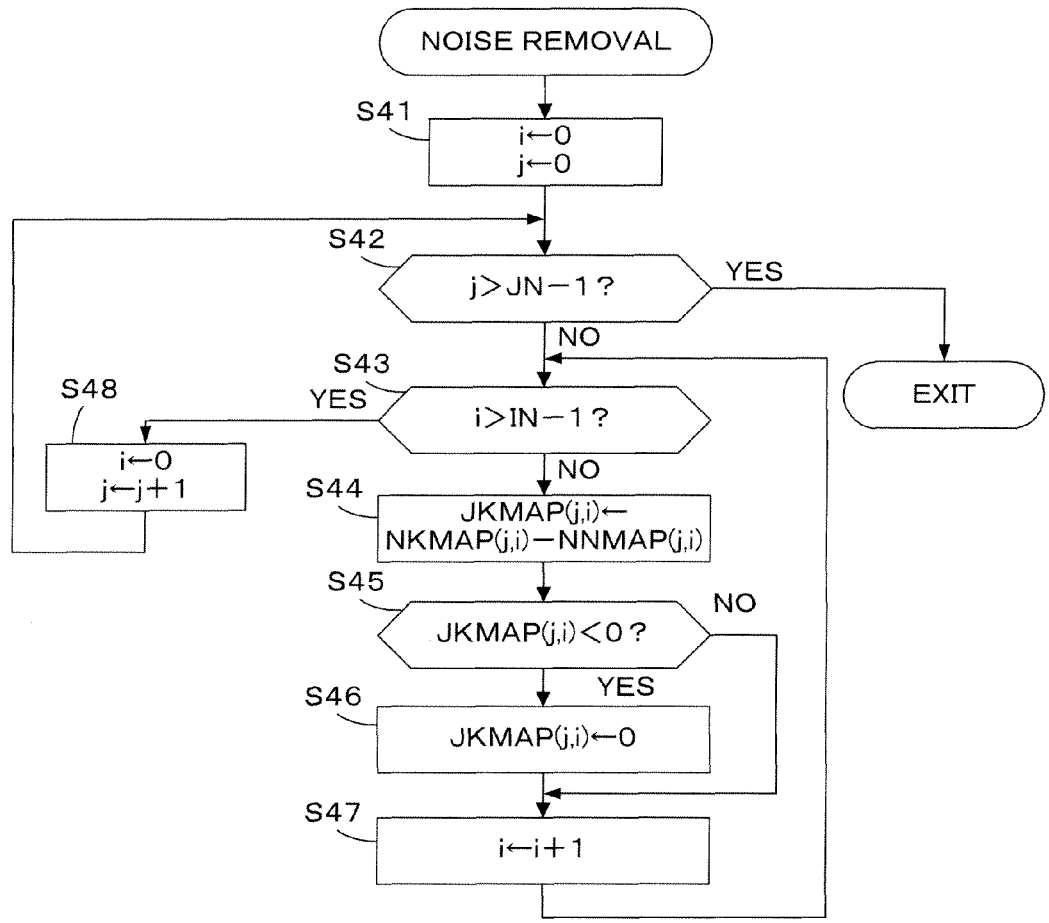

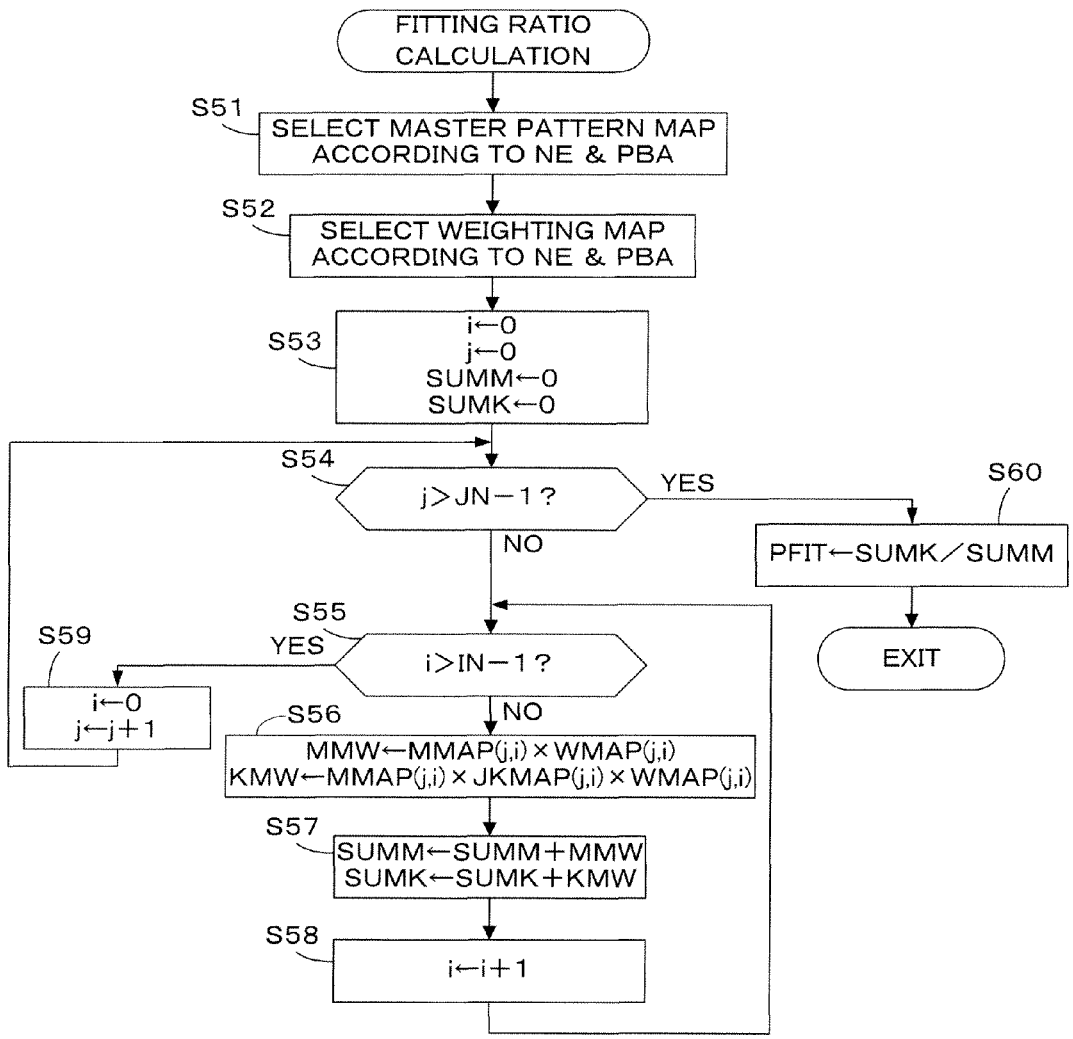
[FIG. 14]

[FIG. 15]

| | | NE | | | | | |
|---|---|---|---|---|---|---|---|
| | | LOW ENGINE SPEED REGION | | MEDIUM ENGINE SPEED REGION | | HIGH ENGINE SPEED REGION | |
| PBA | LOW ENGINE LOAD REGION | MASTER PATTERN MAP | WEIGHTING MAP | MASTER PATTERN MAP | WEIGHTING MAP | MASTER PATTERN MAP | WEIGHTING MAP |
| | MEDIUM ENGINE LOAD REGION | MASTER PATTERN MAP | WEIGHTING MAP | MASTER PATTERN MAP | WEIGHTING MAP | MASTER PATTERN MAP | WEIGHTING MAP |
| | HIGH ENGINE LOAD REGION | MASTER PATTERN MAP | WEIGHTING MAP | MASTER PATTERN MAP | WEIGHTING MAP | MASTER PATTERN MAP | WEIGHTING MAP |

[FIG. 16]
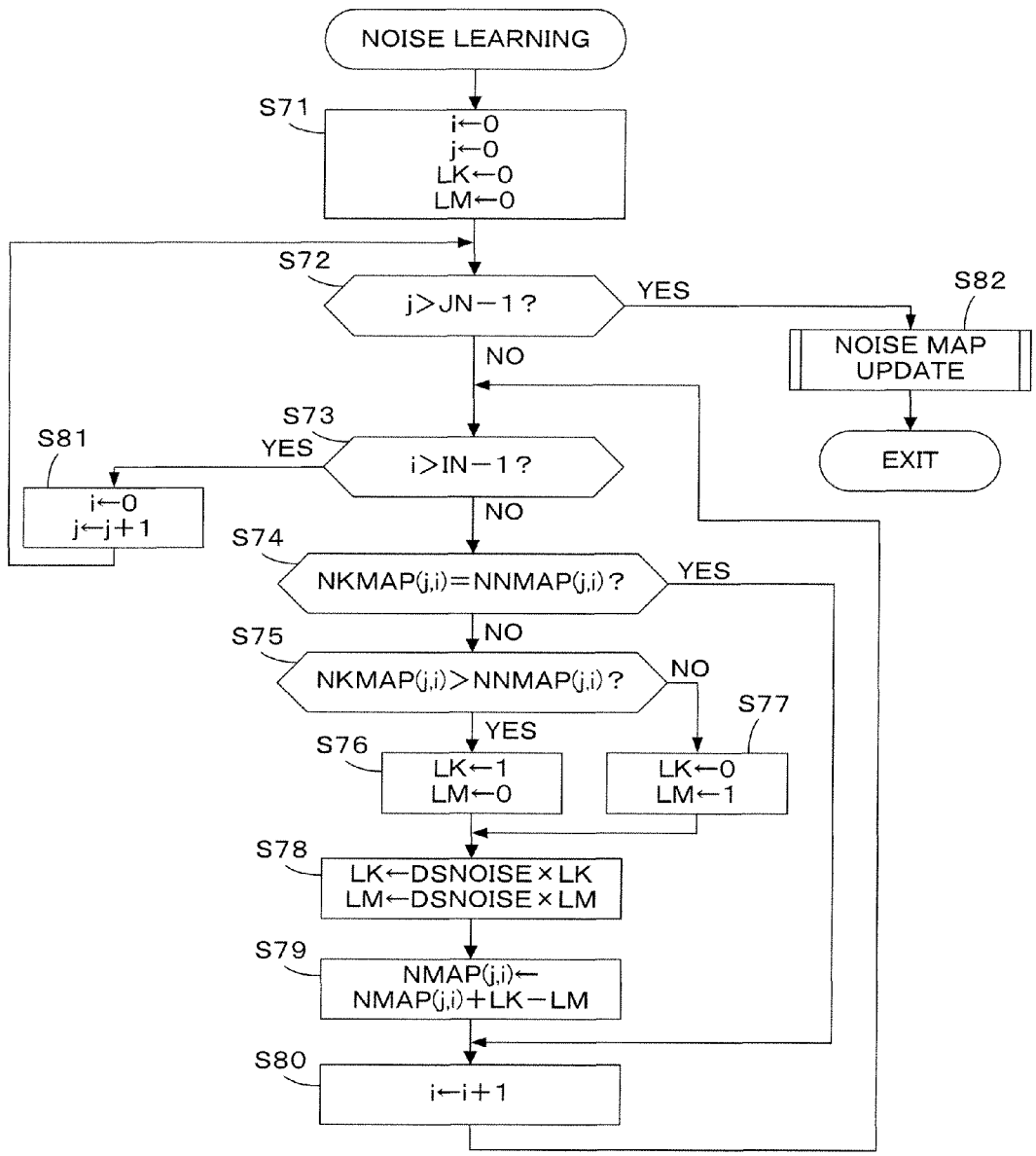

[FIG. 17]
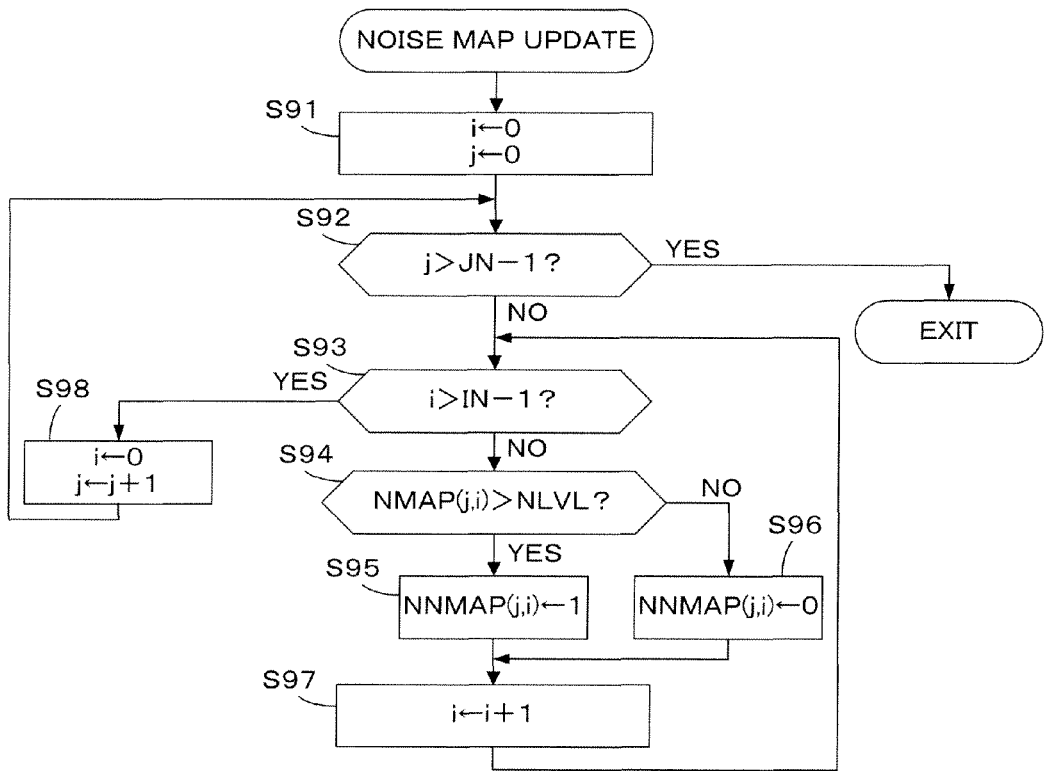

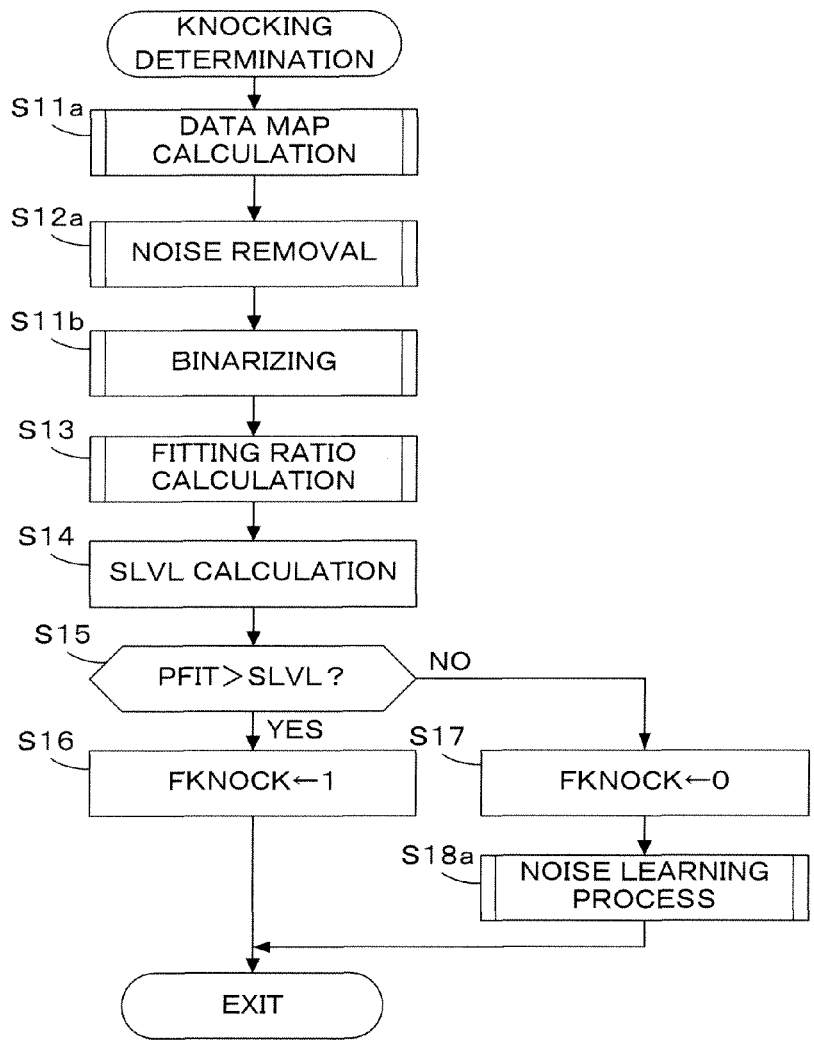
[FIG. 18]

| FREQUENCY \ CRANK ANGLE | 6 | 12 | 18 | 24 | 30 | 36 | 42 | 48 | 54 | 60 | 66 | 72 | 78 | 84 | 90 |
|---|---|---|---|---|---|---|---|---|---|---|---|---|---|---|---|
| 25 | 106 | 56 | 24 | 30 | 24 | 26 | 26 | 76 | 26 | 26 | 30 | 30 | 44 | 44 | 30 |
| 24 | 116 | 66 | 24 | 44 | 24 | 24 | 44 | 74 | 24 | 24 | 44 | 44 | 43 | 43 | 44 |
| 23 | 128 | 78 | 52 | 43 | 34 | 24 | 43 | 74 | 34 | 24 | 43 | 43 | 41 | 44 | 43 |
| 22 | 117 | 67 | 67 | 41 | 43 | 43 | 41 | 84 | 35 | 34 | 24 | 41 | 30 | 43 | 41 |
| 21 | 122 | 80 | 66 | 66 | 41 | 43 | 30 | 85 | 36 | 35 | 24 | 24 | 24 | 41 | 30 |
| 20 | 127 | 77 | 43 | 60 | 56 | 41 | 43 | 86 | 43 | 36 | 34 | 24 | 24 | 30 | 24 |
| 19 | 116 | 66 | 41 | 43 | 67 | 53 | 41 | 93 | 32 | 43 | 35 | 34 | 34 | 24 | 24 |
| 18 | 106 | 56 | 43 | 41 | 43 | 53 | 34 | 93 | 31 | 32 | 36 | 35 | 35 | 24 | 34 |
| 17 | 110 | 60 | 60 | 60 | 41 | 52 | 52 | 91 | 25 | 31 | 43 | 36 | 36 | 34 | 35 |
| 16 | 114 | 64 | 66 | 66 | 60 | 43 | 51 | 101 | 43 | 25 | 32 | 43 | 43 | 35 | 36 |
| 15 | 112 | 62 | 43 | 32 | 64 | 56 | 43 | 101 | 34 | 43 | 31 | 32 | 32 | 36 | 43 |
| 14 | 110 | 60 | 41 | 32 | 43 | 56 | 56 | 101 | 52 | 34 | 25 | 31 | 31 | 43 | 32 |
| 13 | 108 | 58 | 56 | 43 | 41 | 43 | 54 | 101 | 50 | 43 | 43 | 25 | 25 | 32 | 31 |
| 12 | 116 | 66 | 57 | 60 | 32 | 41 | 43 | 93 | 53 | 52 | 34 | 43 | 43 | 31 | 25 |
| 11 | 126 | 76 | 62 | 62 | 67 | 32 | 41 | 91 | 43 | 51 | 52 | 34 | 34 | 25 | 43 |
| 10 | 116 | 66 | 43 | 43 | 56 | 65 | 67 | 82 | 41 | 50 | 51 | 43 | 43 | 43 | 34 |
| 9 | 107 | 57 | 43 | 41 | 43 | 64 | 64 | 106 | 32 | 32 | 50 | 51 | 40 | 34 | 43 |
| 8 | 103 | 53 | 41 | 41 | 41 | 32 | 67 | 105 | 53 | 32 | 50 | 51 | 51 | 43 | 40 |
| 7 | 116 | 66 | 75 | 68 | 70 | 68 | 69 | 120 | 67 | 66 | 63 | 64 | 62 | 52 | 38 |
| 6 | 126 | 76 | 75 | 68 | 70 | 68 | 69 | 120 | 67 | 66 | 63 | 64 | 62 | 60 | 60 |
| 5 | 34 | 35 | 30 | 44 | 43 | 41 | 30 | 24 | 24 | 34 | 35 | 36 | 43 | 32 | 31 |

(b)

| FREQUENCY \ CRANK ANGLE | 6 | 12 | 18 | 24 | 30 | 36 | 42 | 48 | 54 | 60 | 66 | 72 | 78 | 84 | 90 |
|---|---|---|---|---|---|---|---|---|---|---|---|---|---|---|---|
| 25 | 80 | 0 | 0 | 0 | 0 | 0 | 0 | 50 | 0 | 0 | 0 | 0 | 0 | 0 | 0 |
| 24 | 80 | 0 | 0 | 0 | 0 | 0 | 0 | 50 | 0 | 0 | 0 | 0 | 0 | 0 | 0 |
| 23 | 80 | 0 | 0 | 0 | 0 | 0 | 0 | 50 | 0 | 0 | 0 | 0 | 0 | 0 | 0 |
| 22 | 80 | 0 | 0 | 0 | 0 | 0 | 0 | 50 | 0 | 0 | 0 | 0 | 0 | 0 | 0 |
| 21 | 80 | 0 | 0 | 0 | 0 | 0 | 0 | 50 | 0 | 0 | 0 | 0 | 0 | 0 | 0 |
| 20 | 80 | 0 | 0 | 0 | 0 | 0 | 0 | 50 | 0 | 0 | 0 | 0 | 0 | 0 | 0 |
| 19 | 80 | 0 | 0 | 0 | 0 | 0 | 0 | 50 | 0 | 0 | 0 | 0 | 0 | 0 | 0 |
| 18 | 80 | 0 | 0 | 0 | 0 | 0 | 0 | 50 | 0 | 0 | 0 | 0 | 0 | 0 | 0 |
| 17 | 80 | 0 | 0 | 0 | 0 | 0 | 0 | 50 | 0 | 0 | 0 | 0 | 0 | 0 | 0 |
| 16 | 80 | 0 | 0 | 0 | 0 | 0 | 0 | 50 | 0 | 0 | 0 | 0 | 0 | 0 | 0 |
| 15 | 80 | 0 | 0 | 0 | 0 | 0 | 0 | 50 | 0 | 0 | 0 | 0 | 0 | 0 | 0 |
| 14 | 80 | 0 | 0 | 0 | 0 | 0 | 0 | 50 | 0 | 0 | 0 | 0 | 0 | 0 | 0 |
| 13 | 80 | 0 | 0 | 0 | 0 | 0 | 0 | 50 | 0 | 0 | 0 | 0 | 0 | 0 | 0 |
| 12 | 80 | 0 | 0 | 0 | 0 | 0 | 0 | 50 | 0 | 0 | 0 | 0 | 0 | 0 | 0 |
| 11 | 80 | 0 | 0 | 0 | 0 | 0 | 0 | 50 | 0 | 0 | 0 | 0 | 0 | 0 | 0 |
| 10 | 80 | 0 | 0 | 0 | 0 | 0 | 0 | 50 | 0 | 0 | 0 | 0 | 0 | 0 | 0 |
| 9 | 80 | 0 | 0 | 0 | 0 | 0 | 0 | 50 | 0 | 0 | 0 | 0 | 0 | 0 | 0 |
| 8 | 80 | 0 | 0 | 0 | 0 | 0 | 0 | 50 | 0 | 0 | 0 | 0 | 0 | 0 | 0 |
| 7 | 80 | 0 | 0 | 0 | 0 | 0 | 0 | 50 | 0 | 0 | 0 | 0 | 0 | 0 | 0 |
| 6 | 80 | 0 | 0 | 0 | 0 | 0 | 0 | 50 | 0 | 0 | 0 | 0 | 0 | 0 | 0 |
| 5 | 0 | 0 | 0 | 0 | 0 | 0 | 0 | 0 | 0 | 0 | 0 | 0 | 0 | 0 | 0 |

| | | \multicolumn{15}{c}{CRANK ANGLE} |
|---|---|---|---|---|---|---|---|---|---|---|---|---|---|---|---|
| | | 6 | 12 | 18 | 24 | 30 | 36 | 42 | 48 | 54 | 60 | 66 | 72 | 78 | 84 | 90 |
| FREQUENCY | 25 | 26 | 56 | 24 | 30 | 24 | 26 | 26 | 26 | 26 | 26 | 30 | 30 | 44 | 44 | 30 |
| | 24 | 36 | 66 | 24 | 44 | 24 | 24 | 44 | 24 | 24 | 24 | 44 | 44 | 43 | 43 | 44 |
| | 23 | 48 | 78 | 52 | 43 | 34 | 24 | 43 | 24 | 34 | 24 | 43 | 43 | 41 | 44 | 43 |
| | 22 | 37 | 67 | 67 | 41 | 43 | 43 | 41 | 34 | 35 | 34 | 24 | 41 | 30 | 43 | 41 |
| | 21 | 47 | 80 | 66 | 66 | 41 | 43 | 30 | 35 | 36 | 35 | 24 | 24 | 24 | 41 | 30 |
| | 20 | 47 | 77 | 43 | 60 | 56 | 41 | 43 | 36 | 43 | 36 | 34 | 24 | 24 | 30 | 24 |
| | 19 | 36 | 66 | 41 | 43 | 67 | 53 | 41 | 43 | 32 | 43 | 35 | 34 | 34 | 24 | 24 |
| | 18 | 26 | 56 | 43 | 41 | 43 | 53 | 34 | 43 | 31 | 32 | 36 | 35 | 35 | 24 | 34 |
| | 17 | 30 | 60 | 60 | 60 | 41 | 52 | 52 | 41 | 25 | 31 | 43 | 36 | 36 | 34 | 35 |
| | 16 | 34 | 64 | 66 | 66 | 60 | 43 | 51 | 51 | 43 | 25 | 32 | 43 | 43 | 35 | 36 |
| | 15 | 32 | 62 | 43 | 32 | 64 | 56 | 43 | 51 | 34 | 43 | 31 | 32 | 32 | 36 | 43 |
| | 14 | 30 | 60 | 41 | 32 | 43 | 56 | 56 | 51 | 52 | 34 | 25 | 31 | 31 | 43 | 32 |
| | 13 | 28 | 58 | 56 | 43 | 41 | 43 | 54 | 51 | 50 | 43 | 43 | 25 | 25 | 32 | 31 |
| | 12 | 36 | 66 | 57 | 60 | 32 | 41 | 43 | 43 | 53 | 52 | 34 | 43 | 43 | 31 | 25 |
| | 11 | 46 | 76 | 62 | 62 | 67 | 32 | 41 | 41 | 43 | 51 | 52 | 34 | 34 | 25 | 43 |
| | 10 | 36 | 66 | 43 | 43 | 56 | 65 | 67 | 32 | 41 | 50 | 51 | 43 | 43 | 43 | 34 |
| | 9 | 27 | 57 | 43 | 41 | 43 | 64 | 64 | 56 | 32 | 32 | 50 | 51 | 40 | 34 | 43 |
| | 8 | 23 | 53 | 41 | 41 | 41 | 32 | 67 | 55 | 53 | 32 | 50 | 51 | 51 | 43 | 40 |
| | 7 | 36 | 66 | 75 | 68 | 70 | 68 | 69 | 70 | 67 | 66 | 63 | 64 | 62 | 52 | 38 |
| | 6 | 46 | 76 | 75 | 68 | 70 | 68 | 69 | 70 | 67 | 66 | 63 | 64 | 62 | 60 | 60 |
| | 5 | 34 | 35 | 30 | 44 | 43 | 41 | 30 | 24 | 24 | 34 | 35 | 36 | 43 | 32 | 31 |

(b)

| | | \multicolumn{15}{c}{CRANK ANGLE} |
|---|---|---|---|---|---|---|---|---|---|---|---|---|---|---|---|
| | | 6 | 12 | 18 | 24 | 30 | 36 | 42 | 48 | 54 | 60 | 66 | 72 | 78 | 84 | 90 |
| FREQUENCY | 25 | 0 | 1 | 0 | 0 | 0 | 0 | 0 | 0 | 0 | 0 | 0 | 0 | 0 | 0 | 0 |
| | 24 | 0 | 1 | 0 | 0 | 0 | 0 | 0 | 0 | 0 | 0 | 0 | 0 | 0 | 0 | 0 |
| | 23 | 0 | 1 | 1 | 0 | 0 | 0 | 0 | 0 | 0 | 0 | 0 | 0 | 0 | 0 | 0 |
| | 22 | 0 | 1 | 1 | 0 | 0 | 0 | 0 | 0 | 0 | 0 | 0 | 0 | 0 | 0 | 0 |
| | 21 | 0 | 1 | 1 | 0 | 0 | 0 | 0 | 0 | 0 | 0 | 0 | 0 | 0 | 0 | 0 |
| | 20 | 0 | 1 | 0 | 1 | 0 | 0 | 0 | 0 | 0 | 0 | 0 | 0 | 0 | 0 | 0 |
| | 19 | 0 | 1 | 0 | 0 | 1 | 0 | 0 | 0 | 0 | 0 | 0 | 0 | 0 | 0 | 0 |
| | 18 | 0 | 1 | 0 | 0 | 1 | 0 | 0 | 0 | 0 | 0 | 0 | 0 | 0 | 0 | 0 |
| | 17 | 0 | 1 | 1 | 1 | 0 | 1 | 0 | 0 | 0 | 0 | 0 | 0 | 0 | 0 | 0 |
| | 16 | 0 | 1 | 1 | 1 | 1 | 0 | 1 | 0 | 0 | 0 | 0 | 0 | 0 | 0 | 0 |
| | 15 | 0 | 1 | 0 | 0 | 1 | 1 | 0 | 1 | 0 | 0 | 0 | 0 | 0 | 0 | 0 |
| | 14 | 0 | 1 | 0 | 0 | 1 | 1 | 1 | 1 | 0 | 0 | 0 | 0 | 0 | 0 | 0 |
| | 13 | 0 | 1 | 1 | 0 | 0 | 0 | 1 | 1 | 1 | 0 | 0 | 0 | 0 | 0 | 0 |
| | 12 | 0 | 1 | 1 | 1 | 0 | 0 | 0 | 0 | 1 | 1 | 0 | 0 | 0 | 0 | 0 |
| | 11 | 0 | 1 | 1 | 1 | 1 | 0 | 0 | 0 | 0 | 1 | 1 | 0 | 0 | 0 | 0 |
| | 10 | 0 | 1 | 0 | 0 | 1 | 1 | 1 | 0 | 0 | 1 | 1 | 0 | 0 | 0 | 0 |
| | 9 | 0 | 1 | 0 | 0 | 0 | 1 | 1 | 1 | 0 | 0 | 1 | 1 | 0 | 0 | 0 |
| | 8 | 0 | 1 | 0 | 0 | 0 | 0 | 1 | 1 | 1 | 0 | 1 | 1 | 1 | 0 | 0 |
| | 7 | 0 | 1 | 1 | 1 | 1 | 1 | 1 | 1 | 1 | 1 | 1 | 1 | 1 | 1 | 0 |
| | 6 | 0 | 1 | 1 | 1 | 1 | 1 | 1 | 1 | 1 | 1 | 1 | 1 | 1 | 1 | 1 |
| | 5 | 0 | 0 | 0 | 0 | 0 | 0 | 0 | 0 | 0 | 0 | 0 | 0 | 0 | 0 | 0 |

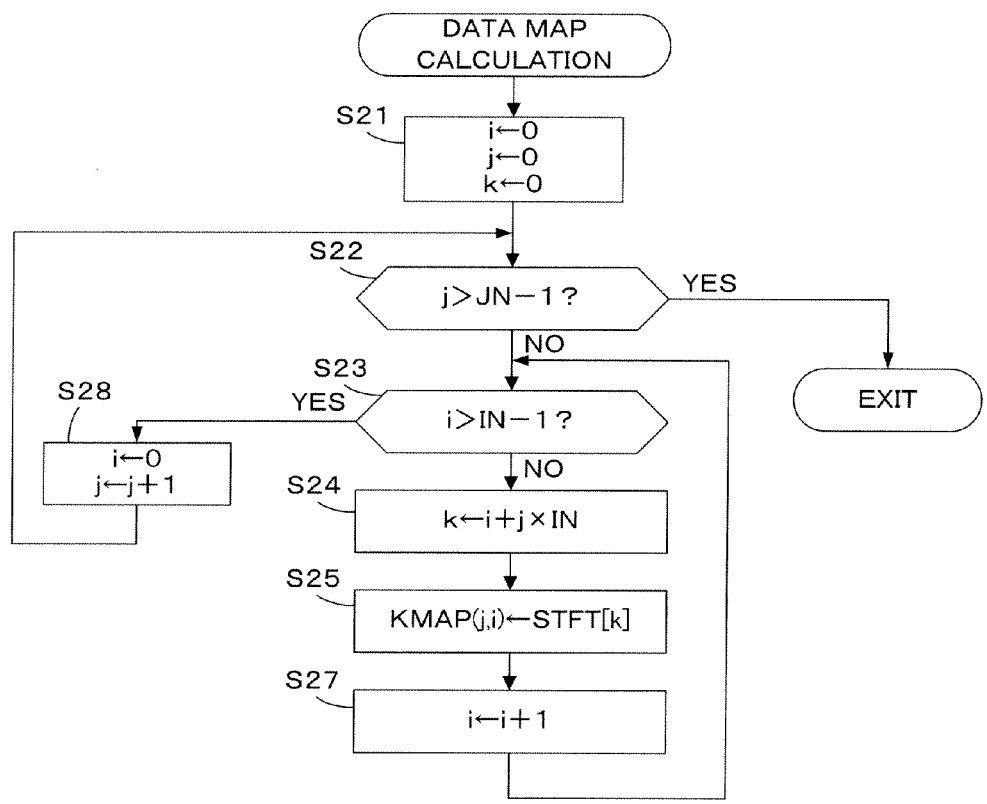
[FIG. 21]

[FIG. 22]
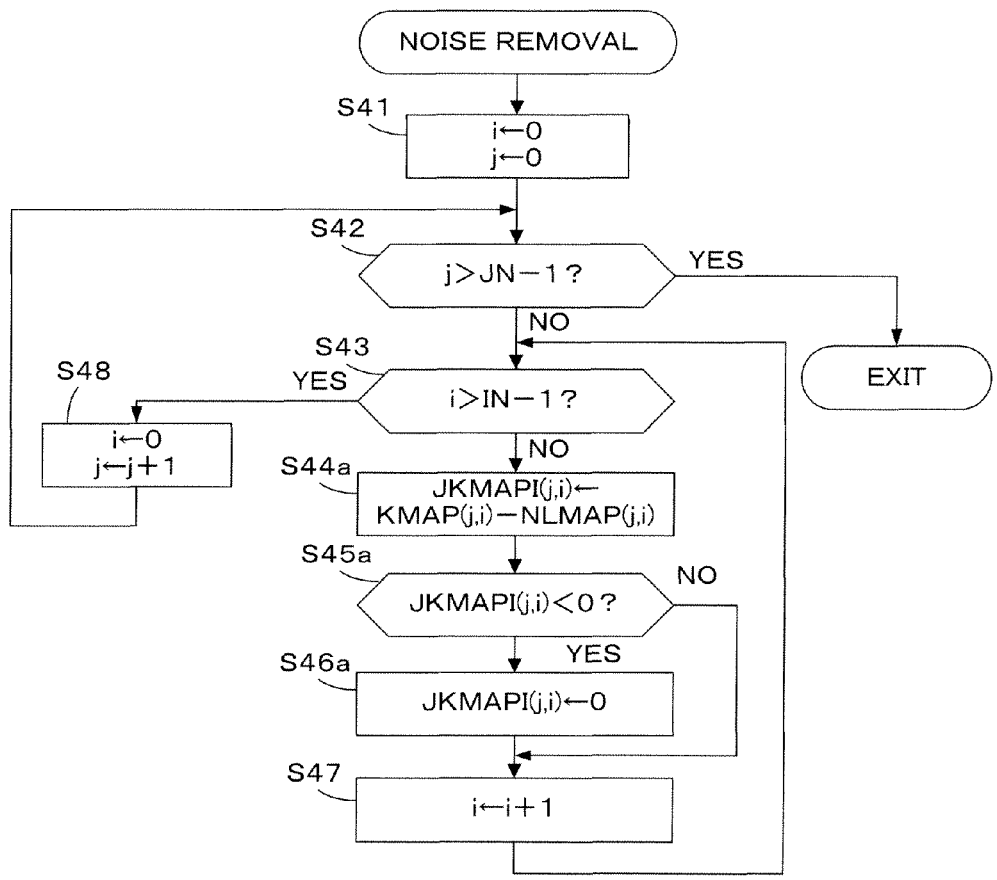

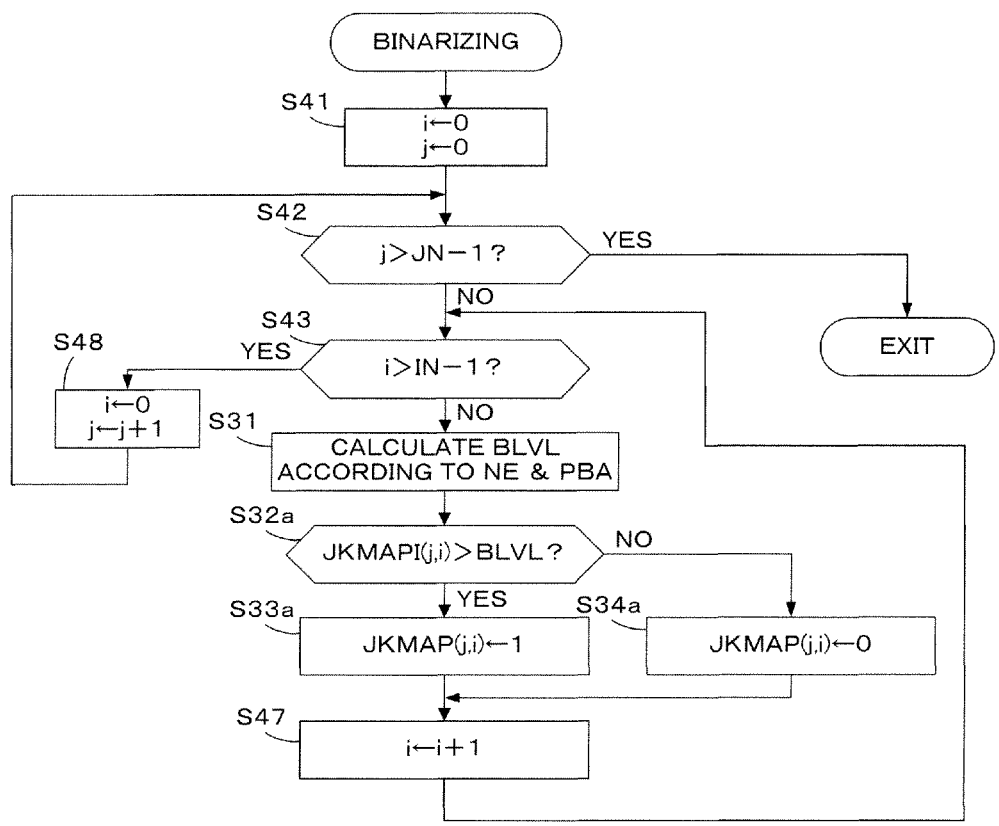

[FIG. 24]
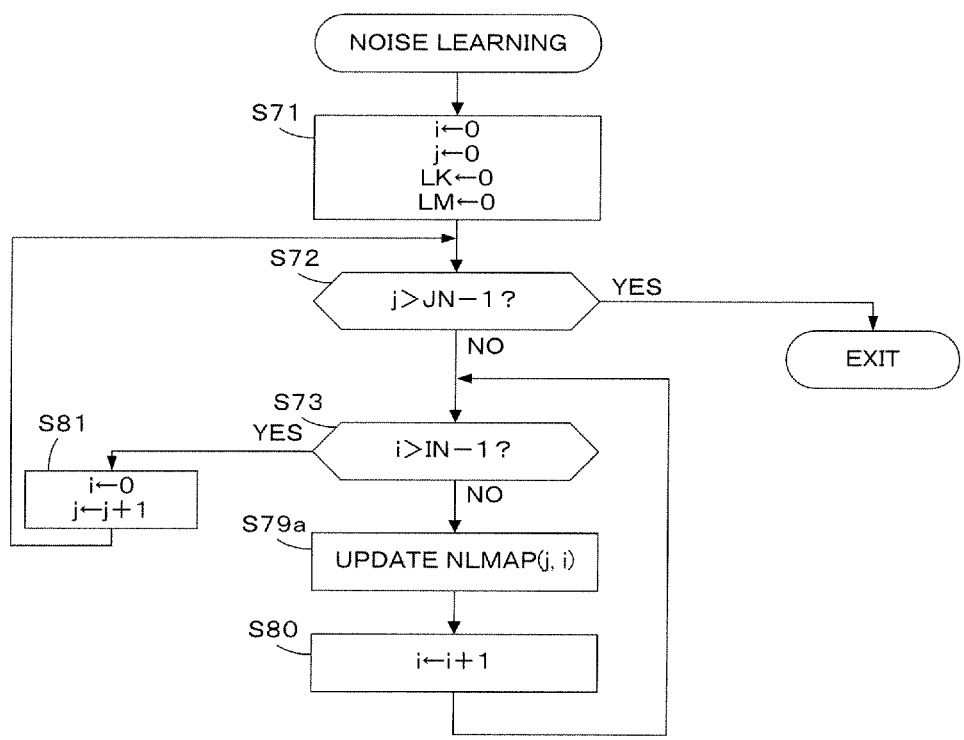

| | | | CRANK ANGLE | | | | | | | | | | | | | |
|---|---|---|---|---|---|---|---|---|---|---|---|---|---|---|---|---|
| | | | 6 | 12 | 18 | 24 | 30 | 36 | 42 | 48 | 54 | 60 | 66 | 72 | 78 | 84 | 90 |
| FREQUENCY | G7 | 25 | 30 | 55 | 34 | 30 | 30 | 30 | 23 | 25 | 46 | 52 | 32 | 32 | 34 | 42 | 30 |
| | | 24 | 24 | 65 | 55 | 24 | 24 | 30 | 30 | 30 | 23 | 50 | 46 | 34 | 42 | 30 | 24 |
| | | 23 | 32 | 100 | 100 | 30 | 30 | 30 | 23 | 25 | 46 | 55 | 32 | 32 | 32 | 32 | 33 |
| | G6 | 22 | 33 | 85 | 88 | 33 | 45 | 33 | 30 | 30 | 30 | 52 | 25 | 46 | 33 | 33 | 24 |
| | | 21 | 24 | 62 | 80 | 76 | 24 | 24 | 24 | 30 | 30 | 60 | 23 | 25 | 46 | 24 | 36 |
| | | 20 | 36 | 36 | 36 | 89 | 45 | 30 | 30 | 30 | 23 | 48 | 46 | 36 | 36 | 36 | 43 |
| | G5 | 19 | 43 | 66 | 43 | 43 | 86 | 85 | 43 | 43 | 43 | 60 | 33 | 43 | 43 | 43 | 30 |
| | | 18 | 33 | 85 | 84 | 30 | 30 | 86 | 83 | 30 | 30 | 55 | 30 | 23 | 25 | 46 | 24 |
| | | 17 | 24 | 80 | 82 | 84 | 24 | 24 | 84 | 24 | 24 | 52 | 36 | 24 | 24 | 24 | 32 |
| | G4 | 16 | 36 | 32 | 32 | 85 | 82 | 23 | 45 | 32 | 30 | 51 | 30 | 23 | 25 | 46 | 43 |
| | | 15 | 43 | 84 | 33 | 33 | 85 | 85 | 80 | 43 | 33 | 60 | 30 | 33 | 33 | 24 | 33 |
| | | 14 | 30 | 82 | 82 | 24 | 24 | 75 | 73 | 65 | 24 | 54 | 24 | 24 | 24 | 36 | 24 |
| | G3 | 13 | 24 | 36 | 81 | 81 | 36 | 36 | 30 | 30 | 30 | 55 | 25 | 46 | 36 | 43 | 36 |
| | | 12 | 32 | 43 | 43 | 68 | 80 | 80 | 43 | 43 | 43 | 60 | 33 | 30 | 33 | 30 | 43 |
| | | 11 | 43 | 80 | 30 | 30 | 77 | 75 | 80 | 80 | 80 | 50 | 30 | 30 | 30 | 24 | 30 |
| | G2 | 10 | 24 | 88 | 78 | 24 | 24 | 24 | 80 | 80 | 80 | 54 | 24 | 33 | 33 | 30 | 33 |
| | | 9 | 32 | 85 | 86 | 86 | 32 | 32 | 32 | 32 | 71 | 120 | 72 | 32 | 32 | 43 | 32 |
| | | 8 | 33 | 66 | 66 | 78 | 80 | 80 | 65 | 33 | 33 | 104 | 71 | 33 | 33 | 33 | 33 |
| | G1 | 7 | 34 | 77 | 85 | 76 | 64 | 65 | 64 | 67 | 56 | 55 | 24 | 24 | 24 | 24 | 24 |
| | | 6 | 36 | 88 | 87 | 87 | 87 | 85 | 85 | 85 | 85 | 112 | 65 | 65 | 65 | 56 | 56 |
| | | 5 | 43 | 43 | 43 | 56 | 56 | 56 | 56 | 56 | 56 | 134 | 84 | 84 | 84 | 84 | 82 |

(b)

| | | CRANK ANGLE | | | | | | | | | | | | | | |
|---|---|---|---|---|---|---|---|---|---|---|---|---|---|---|---|---|
| | | 6 | 12 | 18 | 24 | 30 | 36 | 42 | 48 | 54 | 60 | 66 | 72 | 78 | 84 | 90 |
| FREQUENCY GROUP | G7 | 32 | 100 | 100 | 30 | 30 | 30 | 30 | 30 | 46 | 55 | 46 | 34 | 42 | 42 | 33 |
| | G6 | 36 | 85 | 88 | 89 | 45 | 33 | 30 | 30 | 30 | 60 | 46 | 46 | 46 | 36 | 43 |
| | G5 | 43 | 85 | 84 | 84 | 86 | 86 | 84 | 43 | 43 | 60 | 36 | 43 | 43 | 46 | 32 |
| | G4 | 43 | 84 | 82 | 82 | 85 | 85 | 80 | 65 | 33 | 60 | 30 | 33 | 33 | 46 | 43 |
| | G3 | 43 | 80 | 81 | 81 | 80 | 80 | 80 | 80 | 80 | 60 | 33 | 46 | 36 | 43 | 43 |
| | G2 | 33 | 88 | 88 | 88 | 80 | 80 | 80 | 80 | 80 | 120 | 72 | 33 | 33 | 43 | 33 |
| | G1 | 43 | 88 | 87 | 87 | 87 | 87 | 85 | 85 | 85 | 134 | 84 | 84 | 84 | 84 | 82 |

| | | \multicolumn{15}{c}{CRANK ANGLE} |
|---|---|---|---|---|---|---|---|---|---|---|---|---|---|---|---|---|
| | | 6 | 12 | 18 | 24 | 30 | 36 | 42 | 48 | 54 | 60 | 66 | 72 | 78 | 84 | 90 |
| FREQUENCY GROUP | G7 | 32 | 100 | 100 | 30 | 30 | 30 | 30 | 30 | 46 | 55 | 46 | 34 | 42 | 42 | 33 |
| | G6 | 36 | 85 | 88 | 89 | 45 | 33 | 30 | 30 | 30 | 60 | 46 | 46 | 46 | 36 | 43 |
| | G5 | 43 | 85 | 84 | 84 | 86 | 86 | 84 | 43 | 43 | 60 | 36 | 43 | 43 | 46 | 32 |
| | G4 | 43 | 84 | 82 | 82 | 85 | 85 | 80 | 65 | 33 | 60 | 30 | 33 | 33 | 46 | 43 |
| | G3 | 43 | 80 | 81 | 81 | 80 | 80 | 80 | 80 | 80 | 60 | 33 | 46 | 36 | 43 | 43 |
| | G2 | 33 | 88 | 88 | 88 | 80 | 80 | 80 | 80 | 80 | 120 | 72 | 33 | 33 | 43 | 33 |
| | G1 | 43 | 88 | 87 | 87 | 87 | 87 | 85 | 85 | 85 | 134 | 84 | 84 | 84 | 84 | 82 |

(b)

| | | \multicolumn{15}{c}{CRANK ANGLE} |
|---|---|---|---|---|---|---|---|---|---|---|---|---|---|---|---|---|
| | | 6 | 12 | 18 | 24 | 30 | 36 | 42 | 48 | 54 | 60 | 66 | 72 | 78 | 84 | 90 |
| FREQUENCY GROUP | G7 | 30 | 30 | 30 | 30 | 30 | 30 | 30 | 30 | 30 | 50 | 30 | 30 | 30 | 30 | 30 |
| | G6 | 30 | 30 | 30 | 30 | 30 | 30 | 30 | 30 | 30 | 50 | 30 | 30 | 30 | 30 | 30 |
| | G5 | 30 | 30 | 30 | 30 | 30 | 30 | 30 | 30 | 30 | 50 | 30 | 30 | 30 | 30 | 30 |
| | G4 | 30 | 30 | 30 | 30 | 30 | 30 | 30 | 30 | 30 | 50 | 30 | 30 | 30 | 30 | 30 |
| | G3 | 30 | 30 | 30 | 30 | 30 | 30 | 30 | 30 | 30 | 50 | 30 | 30 | 30 | 30 | 30 |
| | G2 | 30 | 30 | 30 | 30 | 30 | 30 | 30 | 30 | 30 | 50 | 30 | 30 | 30 | 30 | 30 |
| | G1 | 30 | 30 | 30 | 30 | 30 | 30 | 30 | 30 | 30 | 50 | 30 | 30 | 30 | 30 | 30 |

(c)

| | | \multicolumn{15}{c}{CRANK ANGLE} |
|---|---|---|---|---|---|---|---|---|---|---|---|---|---|---|---|---|
| | | 6 | 12 | 18 | 24 | 30 | 36 | 42 | 48 | 54 | 60 | 66 | 72 | 78 | 84 | 90 |
| FREQUENCY GROUP | G7 | 2 | 70 | 70 | 0 | 0 | 0 | 0 | 0 | 16 | 5 | 16 | 4 | 12 | 12 | 3 |
| | G6 | 6 | 55 | 58 | 59 | 15 | 3 | 0 | 0 | 0 | 10 | 16 | 16 | 16 | 6 | 13 |
| | G5 | 13 | 55 | 54 | 54 | 56 | 56 | 54 | 13 | 13 | 10 | 6 | 13 | 13 | 16 | 2 |
| | G4 | 13 | 54 | 52 | 52 | 55 | 55 | 50 | 35 | 3 | 10 | 0 | 3 | 3 | 16 | 13 |
| | G3 | 13 | 50 | 51 | 51 | 50 | 50 | 50 | 50 | 50 | 10 | 3 | 16 | 6 | 13 | 13 |
| | G2 | 3 | 58 | 58 | 58 | 50 | 50 | 50 | 50 | 50 | 70 | 42 | 3 | 3 | 13 | 3 |
| | G1 | 13 | 58 | 57 | 57 | 57 | 57 | 55 | 55 | 55 | 84 | 54 | 54 | 54 | 54 | 52 |

(d)

| | | \multicolumn{15}{c}{CRANK ANGLE} |
|---|---|---|---|---|---|---|---|---|---|---|---|---|---|---|---|---|
| | | 6 | 12 | 18 | 24 | 30 | 36 | 42 | 48 | 54 | 60 | 66 | 72 | 78 | 84 | 90 |
| FREQUENCY GROUP | G7 | 0 | 1 | 1 | 0 | 0 | 0 | 0 | 0 | 0 | 0 | 0 | 0 | 0 | 0 | 0 |
| | G6 | 0 | 1 | 1 | 1 | 0 | 0 | 0 | 0 | 0 | 0 | 0 | 0 | 0 | 0 | 0 |
| | G5 | 0 | 1 | 1 | 1 | 1 | 1 | 1 | 0 | 0 | 0 | 0 | 0 | 0 | 0 | 0 |
| | G4 | 0 | 1 | 1 | 1 | 1 | 1 | 1 | 0 | 0 | 0 | 0 | 0 | 0 | 0 | 0 |
| | G3 | 0 | 1 | 1 | 1 | 1 | 1 | 1 | 1 | 1 | 0 | 0 | 0 | 0 | 0 | 0 |
| | G2 | 0 | 1 | 1 | 1 | 1 | 1 | 1 | 1 | 1 | 1 | 1 | 0 | 0 | 0 | 0 |
| | G1 | 0 | 1 | 1 | 1 | 1 | 1 | 1 | 1 | 1 | 1 | 1 | 1 | 1 | 1 | 1 |

(e)

| | | \multicolumn{15}{c}{CRANK ANGLE} |
|---|---|---|---|---|---|---|---|---|---|---|---|---|---|---|---|---|
| | | 6 | 12 | 18 | 24 | 30 | 36 | 42 | 48 | 54 | 60 | 66 | 72 | 78 | 84 | 90 |
| FREQUENCY GROUP | G7 | 0 | 1 | 1 | 0 | 0 | 0 | 0 | 0 | 0 | 0 | 0 | 0 | 0 | 0 | 0 |
| | G6 | 0 | 1 | 1 | 1 | 0 | 0 | 0 | 0 | 0 | 0 | 0 | 0 | 0 | 0 | 0 |
| | G5 | 0 | 1 | 1 | 1 | 1 | 1 | 0 | 0 | 0 | 0 | 0 | 0 | 0 | 0 | 0 |
| | G4 | 0 | 1 | 1 | 1 | 1 | 1 | 1 | 0 | 0 | 0 | 0 | 0 | 0 | 0 | 0 |
| | G3 | 0 | 1 | 1 | 1 | 1 | 1 | 1 | 1 | 0 | 0 | 0 | 0 | 0 | 0 | 0 |
| | G2 | 0 | 1 | 1 | 1 | 1 | 1 | 1 | 1 | 1 | 1 | 0 | 0 | 0 | 0 | 0 |
| | G1 | 0 | 1 | 1 | 1 | 1 | 1 | 1 | 1 | 1 | 1 | 1 | 1 | 1 | 1 | 1 |

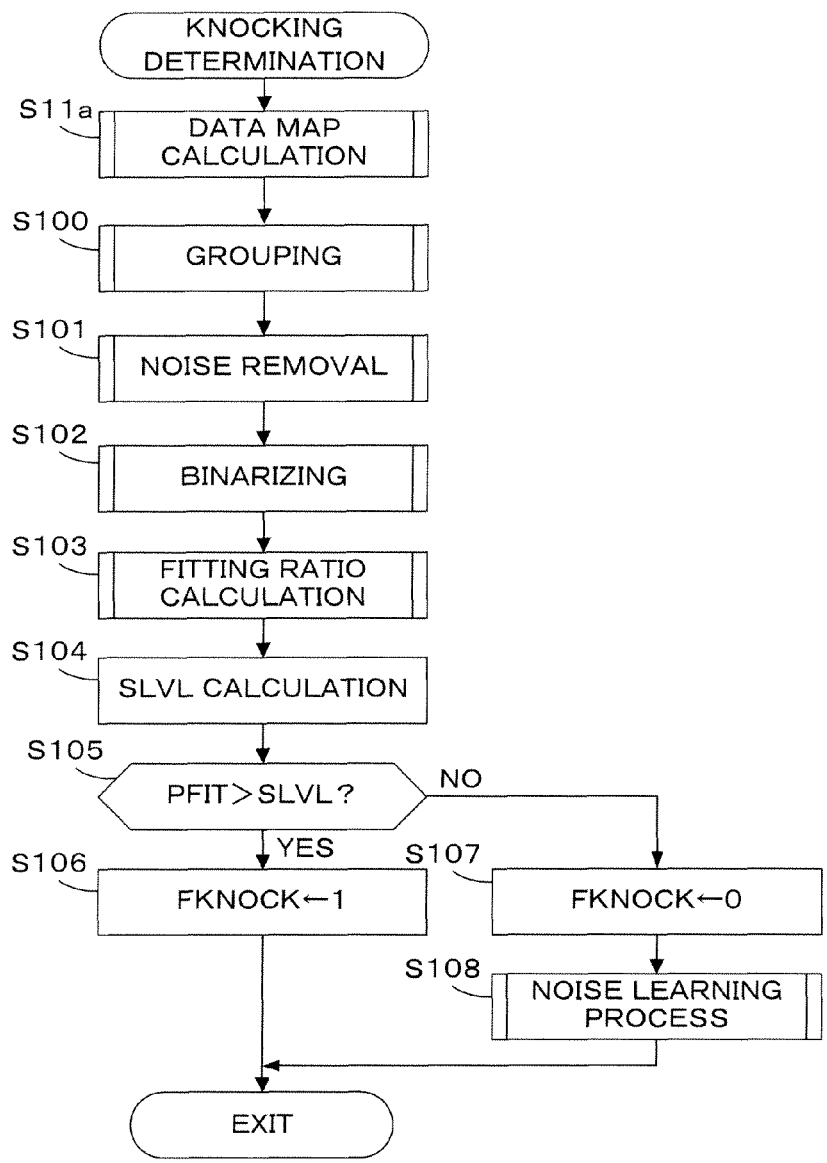
[FIG. 27]

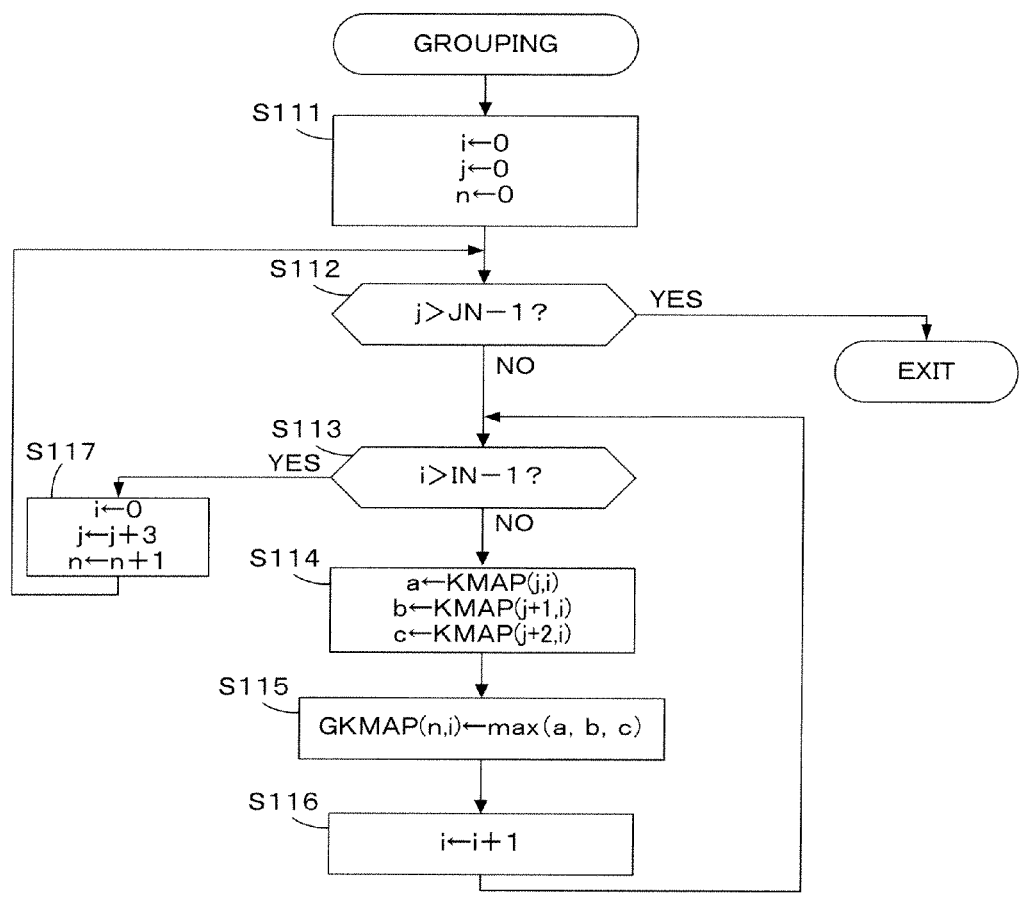
[FIG. 28]

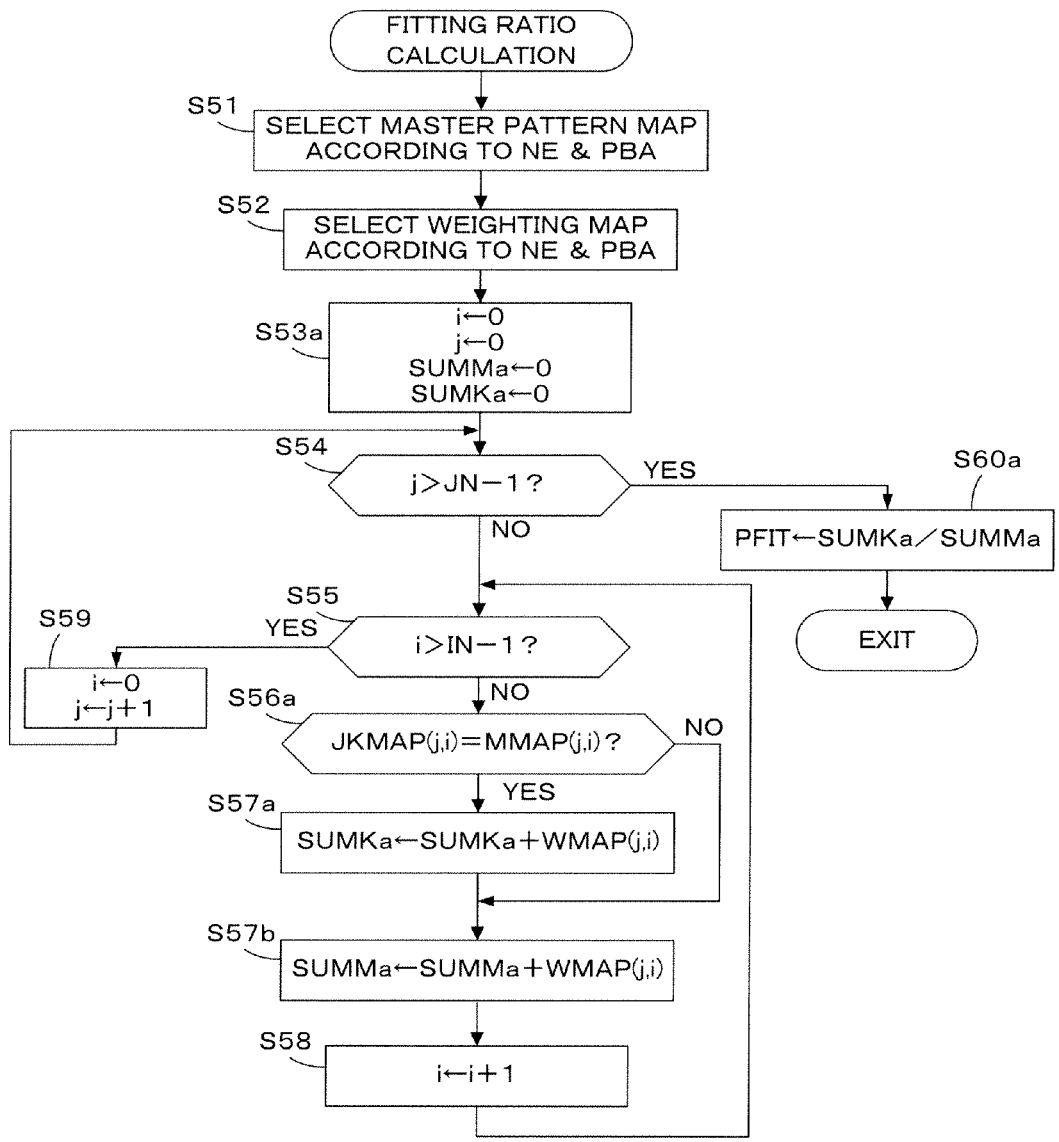

[FIG. 30]
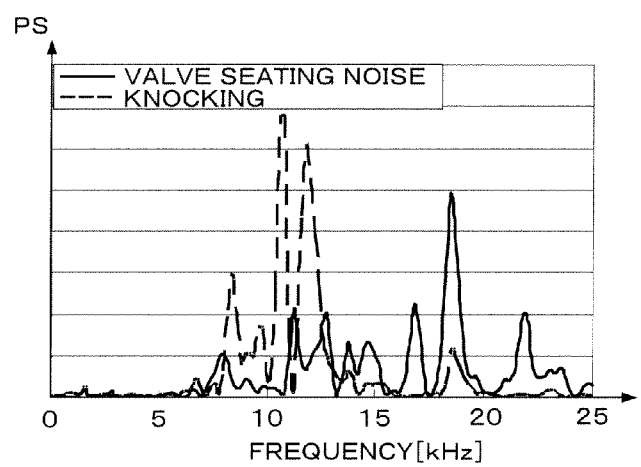

KNOCKING DETECTING APPARATUS FOR INTERNAL COMBUSTION ENGINE

TECHNICAL FIELD

The present invention relates to a knocking detecting apparatus for an internal combustion engine, and particularly to a knocking detecting apparatus for determining occurrence of the knocking based on frequency components of an output signal from a knock sensor.

BACKGROUND ART

Patent document 1 shown below discloses a knocking detecting apparatus wherein a plurality of resonance frequency components contained in an output signal of the knock sensor is obtained, a knocking index is calculated based on the resonance frequency components, and occurrence of the knocking is determined by comparing the knocking index with a predetermined value.

[Patent Document 1] Japanese Patent Publication No. 2684611

DISCLOSURE OF THE INVENTION

Problems to be Solved by the Invention

According to the method shown in Patent document 1, intensities of frequency components corresponding to, for example, sixteen frequencies are calculated with the fast Fourier transform. Further, five frequency components with greater intensity are selected from the sixteen components, and the knocking index is calculated by integrating intensities of the five components with a predetermined weighting. However, in this method, there is a problem described below.

FIG. 30 shows an example of a result of the frequency spectrum analysis regarding the output signal from the knock sensor. The dashed line of FIG. 30 indicates a spectrum upon occurrence of the knocking, and the solid line indicates a spectrum upon occurrence of the vibration due to seating of the intake valve of the engine (this vibration will be referred to as "seating noise"). As shown in FIG. 30, when the influence of the seating noise appears in the output signal of the knock sensor, specific frequency components appear with the intensity similar to that of the knocking. Therefore, erroneous determination that the knocking has occurred may be made, although no knocking has actually occurred.

The present invention was made contemplating the above-described point, and an object of the invention is to provide a knocking detecting apparatus for an internal combustion engine, which can more accurately perform the knocking determination based on frequency components of the output signal of the knock sensor.

Means for Solving the Problems

To attain above-described object, the present provides a knocking detecting apparatus for an internal combustion engine having knocking determining means for performing a knocking determination based on an output signal of a knock sensor (11) mounted on the internal combustion engine (1). The knocking detecting apparatus is characterized by including frequency spectrum analyzing means for performing a frequency spectrum analysis of the knock sensor output signal at predetermined angular intervals of the crankshaft rotation angle of the engine, data storing means for storing intensities of a plurality of frequency components obtained by the frequency spectrum analysis as time series data (KMAP(j,i)), and binarizing means for binarizing the time series data (KMAP(j,i)) of the frequency component intensity. The knocking detecting means determines whether or not a knocking has occurred based on the binarized time series data (NKMAP(j,i)).

With this configuration, the frequency spectrum analysis of the knock sensor output signal is performed at predetermined intervals of the crankshaft rotation angle, and the frequency spectrum of the frequency components obtained by the frequency spectrum analysis is stored as time series data. Subsequently, the time series data of the frequency component intensity are binarized, and whether a knocking has occurred is determined based on the binarized time series data. A change in the frequency spectrum caused by the engine rotation appears in the binarized time series data. Accordingly, by comparing the time series data with the data having the specific change pattern obtained when a knocking has occurred, occurrence of knocking can be accurately determined. Further, the binarizing of data reduces an amount of data and simplifies the change pattern of the time series data, which makes it possible to reduce the memory capacity and raise the computing speed.

Preferably, the knocking determining means performs the knocking determination by comparing the binarized time series data (NMAP(j,i)) with a master pattern data (MMAP(j,i)) corresponding to a state where a knocking has occurred.

With this configuration, the knocking determination is performed by comparing the binarized time series data with the master pattern data corresponding to the state where a knocking has occurred. The possibility that a knocking has occurred is high when the binarized time series data shows a changing pattern similar to the master pattern. Consequently, the knocking determination can be performed accurately by calculating a parameter indicative of the similarity (correlativity) between the obtained time series data and the master pattern.

Preferably, the knocking determining means includes noise component calculating means for calculating time series data (NNMAP(j,i)) of noise components based on the binarized time series data (NKMAP(j,i)), and noise correcting means for correcting the binarized time series data (NKMAP(j,i)) with the time series data (NNMAP(j,i)) of noise components, wherein the knocking determining means performs the knocking determination based on the corrected time series data (JKMAP(j,i)).

With this configuration, the time series data of noise components are calculated based on the binarized time series data, and the binarized time series data are corrected with the time series data of noise components. The knocking determination is performed based on the corrected binarized time series data. Therefore, steadily-appearing noise components such as the above-described seating noise are removed, which makes it possible to accurately perform the determination.

Alternatively, the knocking detecting apparatus may include noise component calculating means for calculating time series data (NNMAP(j,i)) of noise components based on the time series data (KMAP(j,i)) of the frequency component strength, and noise correcting means for correcting the time series data (KMAP(j,i)) of the frequency component strength with the time series data (NNMAP(j,i)) of noise components, wherein the binarizing means binarizes the corrected time series data (JKMAPI(j,i)).

With this configuration, the time series data of noise components are calculated based on the time series data of the frequency component strength, and the time series data of the frequency component strength are corrected with the time series data of noise components. Then, the corrected time series data is binarized and the knocking determination is performed based on the binarized time series data. Reduction of the noise components is more appropriately compared with the case that the correction for noise reduction is performed after binarizing the time series data.

Preferably, the knocking determining means includes weighting means for performing a weighting of the binarized time series data (NKMAP(j,i), JKMAP(j,i)) and the master pattern data (MMAP(j,i)) according to a frequency of the frequency component, and performs the knocking determination using the weighted time series data and the weighted master pattern data.

With this configuration, the weighting of the binarized time series data and the master pattern data is performed according to the frequency of frequency components, and the knocking determination is performed using the weighted time series data and the weighted master pattern data. The frequency components which become greater when a knocking has occurred are previously known. Therefore, by largely weighting the data corresponding to frequencies near the frequencies of the known frequency components, accuracy of the determination can be improved.

Preferably, the knocking determining means calculates the fitting ratio (PFIT) of the binarized time series data (NKMAP (j,i), JKMAP(j,i)) with respect to the master pattern data (MMAP(j,i)), and determines that a knocking has occurred when the fitting ratio (PFIT) exceeds a determination threshold value (SLVL).

With this configuration, the fitting ratio of the binarized time series data with respect to the master pattern data is calculated, and it is determined that a knocking has occurred when the fitting ratio exceeds the determination threshold value. By using the fitting ratio, the correlation between the master pattern data and the binarized time series data can be appropriately estimated with comparatively easy calculation, and the determination is accurately performed.

Preferably, the master pattern data (MMAP(j,i)) are set according to an operating condition of the engine. Accordingly, the determination can be performed accurately regardless of a change in the engine operating condition.

Further, the knocking detecting apparatus includes frequency group time series data generating means for generating frequency group time series data (GKMAP(j,i)) by selecting a maximum strength at one sampling timing with respect to each of frequency groups (G1 to G7) consisting of a plurality of frequencies, wherein the binarizing means binarizes the frequency group time series data (GKMAP(j,i)).

With this configuration, the frequency group time series data are generated by selecting a maximum strength at one sampling timing with respect to each of frequency groups consisting of a plurality of frequencies, the frequency group time series data are binarized, and the knocking determination is performed based on the binarized frequency group time series data. By using the frequency group time series data, an amount of the data applied to the determination decreases to reduce the calculation load on the apparatus.

Preferably, the knocking detecting apparatus includes group noise component calculating means for calculating time series data (GNLMAP(j,i)) of group noise components corresponding to each of the frequency groups based on the frequency group time series data (GKMAP(j,i)), and group noise correcting means for correcting the frequency group time series data (GKMAP(j,i)) with the time series data (GNLMAP(j,i)) of group noise components, wherein the binarizing means binarizes the corrected frequency group time series data (JGKMAPI(j,i)).

With this configuration, the time series data of group noise components corresponding to each of the frequency groups are calculated based on the frequency group time series data (GKMAP(j,i)), and the frequency group time series data (GKMAP(j,i)) are corrected with the time series data (GNLMAP(j,i)) of group noise components. Then, the corrected frequency group time series data are binarized and the knocking determination is performed based on the binarized frequency group time series data. Therefore, influence of the noise components is reduced to make it possible to accurately perform the determination when performing the knocking determination based on the frequency group time series data.

BRIEF DESCRIPTION OF THE DRAWINGS

FIG. 1 is a schematic diagram showing a configuration of an internal combustion engine and a control system therefor according to one embodiment of the present invention.

FIG. 2 shows diagrams for illustrating the sampling and the frequency spectrum analysis of a knock sensor output.

FIG. 3 shows diagrams of the intensity data obtained by the frequency spectrum analysis as a time series spectrum map and a binarized time series spectrum map.

FIG. 4 is a diagram showing the binarized time series spectrum map of the seating noise of the intake valve.

FIG. 5 shows diagrams of binarized time series spectrum maps for illustrating a noise removal process.

FIG. 6 shows diagrams of binarized time series spectrum maps for illustrating the knocking determination using a master pattern map.

FIG. 7 is a diagram showing an example of the weighting map.

FIG. 8 is a flowchart of the knocking determination process.

FIG. 9 is a diagram showing a map referred to in the process of FIG. 8.

FIG. 10 is a flowchart of the binarized data map calculation process executed in the process shown in FIG. 8.

FIG. 11 is a flowchart of the binarizing process executed in the process shown in FIG. 10.

FIG. 12 is a diagram showing a map referred to in the process of FIG. 11.

FIG. 13 is a flowchart of the noise removal process executed in the process shown in FIG. 8.

FIG. 14 is a flowchart of the fitting ratio calculation process executed in the process shown in FIG. 8.

FIG. 15 is a diagram for illustrating the map referred to in the process of FIG. 14.

FIG. 16 is a flowchart of the noise learning process executed in the process shown in FIG. 8.

FIG. 17 is a flowchart of the noise map update process executed in the process shown in FIG. 16.

FIG. 18 is a flowchart of the knocking determination process in the second embodiment of the present invention.

FIG. 19 shows diagrams of the intensity data obtained by the frequency spectrum analysis and the strength data of noise components as a time series spectrum maps.

FIG. 20 shows diagrams of the time series spectrum map after the noise removal process and a map obtained by binarizing the noise-removed time series spectrum map.

FIG. 21 is a flowchart of the data map calculation process executed in the process shown in FIG. 18.

FIG. 22 is a flowchart of the noise removal process executed in the process shown in FIG. 18.

FIG. 23 is a flowchart of the binarizing process executed in the process shown in FIG. 18.

FIG. 24 is a flowchart of the noise learning process executed in the process shown in FIG. 18.

FIG. 25 is a diagram for illustrating the grouping in the third embodiment of the present invention.

FIG. 26 shows diagrams for illustrating the knocking determination based on the time series spectrum maps after the grouping.

FIG. 27 is a flowchart of the knocking determination process in the third embodiment of the present invention.

FIG. 28 is a flowchart of the grouping process executed in the process shown in FIG. 27.

FIG. 29 is a flowchart showing a modification of the process shown in FIG. 14.

FIG. 30 is a diagram for illustrating the problem of the conventional technique.

DESCRIPTION OF REFERENCE NUMERALS

1 Internal combustion engine
5 Electronic control unit (knocking determining means, frequency spectrum analyzing means, data storing means, binarizing means, noise component calculating means, noise correcting means, weighting means, frequency group time series data generating means, group noise component calculating means, group noise correcting means)
11 Knock sensor

BEST MODE FOR CARRYING OUT THE INVENTION

Preferred embodiments of the present invention will now be described with reference to the drawings.

First Embodiment

FIG. 1 is a schematic diagram showing a general configuration of an internal combustion engine (hereinafter referred to as "engine") and a control system therefor according to one embodiment of the present invention. The engine 1 is, for example, a four-cylinder engine having an intake pipe 2 provided with a throttle valve 3. A throttle valve opening sensor 4 which detects a throttle valve opening TH is connected to the throttle valve 3, and a detection signal of the sensor 4 is supplied to an electronic control unit (hereinafter referred to as "ECU") 5.

A fuel injection valve 6 is provided for each cylinder at a position slightly upstream of an intake valve (not shown) in the intake pipe 2 and between the engine 1 and the throttle valves 3. Each injection valve is connected to a fuel pump (not shown) and electrically connected to the ECU 5. A valve opening period of the fuel injection valve 6 is controlled by a signal from the ECU 5. Each cylinder of the engine 1 is provided with a spark plug 7 and each spark plug 7 is connected to the ECU 5. The ECU 5 supplies an ignition signal to each spark plug 7.

An intake pressure sensor 8 for detecting an intake pressure PBA and an intake air temperature sensor 9 for detecting an intake air temperature TA are disposed downstream of the throttle valve 3. Further, a coolant temperature sensor 10 for detecting an engine coolant temperature TW and a knock sensor 11 of the nonresonant type are mounted on the body of the engine 1. The detection signals from the sensors 8 to 11 are supplied to the ECU 5. For example, a sensor which can detect vibration of the frequency band from 5 kHz to 25 kHz is used as the knock sensor 11.

An intake air flow rate sensor 13 for detecting an intake air flow rate GA is provided upstream of the throttle valve 3 in the intake pipe 2, and a detection signal of the intake air flow rate sensor 13 is supplied to the ECU 5.

A crank angle position sensor 11 for detecting a rotational angle of a crankshaft (not shown) of the engine 1 is connected to the ECU 5, and a signal corresponding to a detected rotation angle of the crankshaft is supplied to the ECU 5. The crank angle position sensor 11 includes a cylinder discrimination sensor which outputs a pulse (hereinafter referred to as "CYL pulse") at a predetermined crank angle position for the specific cylinder of the engine 1. The crank angle position sensor 11 also includes a top dead center (TDC) sensor which outputs a TDC pulse at a crank angle position before a TDC of a predetermined crank angle starts at an intake stroke in each cylinder (i.e., at every 180 degree crank angle in the case of four-cylinder engine) and a crank angle (CRK) sensor for generating one pulse (hereinafter referred to as "CRK pulse") in a constant crank angle period (e.g., a period of 6 degrees, which is shorter than the period of generation of the TDC pulse). The CYL pulse, the TDC pulse and the CRK pulse are supplied to the ECU 5. The CYL, TDC and CRK pulses are used for controlling various timings, such as a fuel injection timing and an ignition timing, and detecting an engine rotational speed NE.

The engine 1 is provided with a valve operating characteristic varying device 20 having a first valve operating characteristic varying mechanism and a second valve operating characteristic varying mechanism. The first valve operating characteristic varying mechanism continuously varies the valve lift amount and opening angle (valve opening period) of the intake valve (not shown). The second valve operating characteristic varying mechanism is a cam phase varying mechanism for continuously varying the operating phase of the cam for driving the intake valves with reference to a rotational angle of the crank shaft of the engine 1. The ECU 5 supplies a lift-amount control signal and an operating-phase control signal to a valve operating characteristic varying device 20, and performs the operation control of the intake valve. The configurations of the first and second valve operating characteristic varying mechanisms are respectively shown, for example, in Japanese Patent Laid open No. 2008-25418, and the Japanese Patent Laid open No. 2000-227013.

The ECU 5 includes an input circuit having various functions including a function of shaping the waveforms of input signals from the various sensors, a function of correcting the voltage levels of the input signals to a predetermined level, and a function of converting analog signal values into digital signal values. The ECU 5 further includes a central processing unit (hereinafter referred to as "CPU"), a memory circuit (memory), and a output circuit. The memory circuit preliminarily stores various operating programs to be executed by the CPU and the results of computation or the like by the CPU. The output circuit supplies drive signals to the fuel injection valves 6 and the spark plugs 7.

Next, an outline of the knocking determination method in this embodiment is described below. FIG. 2(a) shows an output signal waveform of the knock sensor 11, and FIG. 2(b) shows an enlarged waveform of the period TS in FIG. 2(a). In this embodiment, the frequency spectrum analysis by the Fast Fourier Transform is performed with respect to 50 data detected at sampling periods of 20 microseconds. A result of the frequency spectrum analysis is shown in FIG. 2(c). The vertical axis of FIG. 2(c) represents an energy intensity PS. In this embodiment, values of the energy intensity PS corresponding to frequencies with 1 kHz interval in the frequency band from 5 kHz to 25 kHz (i.e., 5, 6, 7, . . . , 24, and 25 kHz) are calculated at every six degrees of the crank angle.

According to this calculation, the time series data of the frequency spectrum are calculated in the form of a two-dimensional matrix as shown in FIG. 3(a) (hereinafter referred to as "time series spectrum map"). The time series spectrum map is defined by the vertical line of the frequency f [kHz] and the horizontal line of the crank angle CA [deg] (which is a crank angle from the top dead center at which the combustion stroke starts). In the time series spectrum map, indexes corresponding to the vertical and horizontal lines are respectively used "j" (j=0 to 20) and "i" (i=0 to 14), and an element of the time series spectrum map is expressed as an intensity parameter KMAP(j,i). For example, the intensity parameter KMAP(0,0) corresponds to "34" at the lower left end. The intensity parameters KMAP(0,14), KMAP(20,0), and KMAP(20,14) respectively correspond to "31" at the lower right end, "56" at the upper left end, and "30" at the upper right end. It is to be noted that the intensity parameter KMAP is a nondimensional parameter which indicates a relative intensity.

The time series spectrum map of FIG. 3(a) is binarized to obtain a binarized time series spectrum map shown in FIG. 3(b). A binarized intensity parameter NKMAP(j,i), which is an element of the map of FIG. 3(b), takes a value of "1" when the intensity parameter KMAP(j,i) is equal to or greater than "50", and takes a value of "0" when the intensity parameter KMAP(j,i) is less than "50".

The binarized time series spectrum map shown in FIG. 3(b) is a map obtained when a knocking has occurred as shown in FIG. 30 with the dashed line. On the other hand, the binarized time series spectrum map of the seating noise shown in FIG. 30 with the solid line is shown in FIG. 4. The map of FIG. 4 is clearly different from the map of FIG. 3(b) obtained when a knocking has occurred. Therefore, the seating noise is not erroneously determined to be occurrence of knocking, thereby performing the knocking determination accurately.

Further in this embodiment, a binarized time series spectrum map corresponding to noise components (this spectrum map will be hereinafter referred to as merely "noise map") is generated by the learning calculation based on the binarized time series spectrum map which is obtained when it is determined that no knocking has occurred. Subsequently, the noise learned values on the noise map are subtracted from the corresponding values on the binarized time series spectrum map calculated from the detected data, to remove the influence of noise components.

FIG. 5(a) shows an example of the noise map obtained by the learning calculation. In this example, noise components in the band of 6 to 25 kHz at the timing of six degrees of the crank angle are indicated. FIG. 5(b) shows a binarized time series spectrum map obtained by performing a noise removal process in which the noise components shown in FIG. 5(a) are subtracted from the values of the binarized time series spectrum map shown in FIG. 3(b). By performing the noise removal process described above, influence of the noise components is removed, which makes it possible to perform the determination more accurately.

Further in this embodiment, whether a knocking has occurred is determined by comparing the binarized time series spectrum map obtained from the detected data with a master pattern map shown in FIG. 6(a). The master pattern map corresponds to a typical binarized time series spectrum map obtained when a knocking has occurred.

The above-described comparison is specifically performed as described below. An intensity integrated value SUMK is calculated by integrating a product obtained by multiplying the binarized intensity parameter NKMAP(j,i) on the binarized time series spectrum map by the master parameter MMAP(j,i) on the master pattern map. A reference integrated value SUMM which is an integrated value of the master parameter MMAP(j,i) is calculated, and a fitting ratio PFIT (=SUMK/SUMM) is calculated as a ratio of the intensity integrated value SUMK with respect to the reference integrated value SUMM. Subsequently, if the fitting ratio PFIT exceeds a determination threshold value SLVL, it is determined that a knocking has occurred.

FIG. 6(b) shows a map of products (NKMAP(j,i)×MMAP(j,i)) obtained by multiplying the binarized intensity parameter NKMAP(j,i) shown in FIG. 5(b) by the master parameter MMAP(j,i) on the master pattern map shown in FIG. 6(a). In this example, the product map of FIG. 6(b) is completely the same as the map shown in FIG. 5(b), and the fitting ratio PFIT takes a value of "0.863".

It is noted that, in the actual knocking determination process described below, a weighting of the binarized intensity parameter is performed according to the engine operating condition when calculating the intensity integrated value SUMK and the reference integrated value SUMM. FIG. 7 shows an example of a weighting map in which weighting parameters WMAP(j,i) for performing the weighting are set. The weighting map shown in FIG. 7 is set so that the weighting of the following parameter values is performed: the parameter values from 12 to 72 degrees of the crank angle with respect to the frequency component of 6 kHz, the parameter values from 36 to 66 degrees of the crank angle with respect to the frequency component of 10 kHz, and the parameter values from 12 to 30 degrees of the crank angle with respect to the frequency components of 11 kHz, 13 kHz, 15 kHz, and 20 kHz.

The characteristic with respect to the frequency of the binarized time series spectrum map changes depending on the engine operating condition. Therefore, the weighting using the weighting map shown in FIG. 7 is performed for compensating such changes in the map characteristic. By performing the weighting according to the engine operating condition, it is possible to accurately perform the determination regardless of changes in the engine operating condition.

In this embodiment, the sampling period of the knock sensor output VS is 20 microseconds, and the frequency spectrum analysis is performed by using 50 sampled values. Consequently, this sampling makes it possible to calculate the frequency components up to 25 kHz with 1 kHz interval. It is to be noted that a time period TD6, during which the crankshaft rotates 6 degrees, is 1 millisecond when the engine rotational speed NE is 1000 rpm, and 50 sampled values are obtained in the time period TD6. Further, when the engine rotational speed NE is 2000 rpm, for example, the time period TD6 is 500 microseconds and the number of sampled data in TD6 is "25". Therefore, the frequency spectrum analysis is performed for every 6 degrees of the crank angle using the latest sampled values obtained in the period of 12 degrees of the crank angle.

The frequency spectrum analysis (Fast Fourier Transform) is performed in the calculation process (not shown) of the CPU in the ECU 5, and intensity values STFT(k)(k=0 to (KN−1)) of each frequency, which are obtained as a result of the calculation executed at every 6 degrees of the crank angle, are stored in the memory circuit (RAM) in the ECU 5. "KN" is a number of the intensity values obtained within a crank angular range from 6 degrees to 90 degrees after the top dead center. The number KN is equal to "315" (the number of data on the map shown in FIGS. 3 to 6) in this embodiment.

FIG. 8 is a flowchart of a process for performing the knocking determination with the above-described method. This process is executed by the CPU in the ECU 5 in synchronism with generation of the TDC pulse.

In step S11, the binarized data map calculation process shown in FIG. 10 is executed, to calculate the above-described binarized time series spectrum map. In step S12, the noise removal process shown in FIG. 13 is executed to remove noise components using the noise map shown in FIG. 5(a).

In step S13, the fitting ratio calculation process shown in FIG. 14 is executed, to calculate the fitting ratio PFIT using the binarized time series spectrum map from which the noise components are removed, and the master pattern map.

In step S14, a SLVL map which is set according to the engine rotational speed NE and the intake pressure PBA, for example, as shown in FIG. 9 is retrieved to calculate a determination threshold value SLVL. With respect to an operating point defined by the engine rotational speed NE and the intake pressure PBA other than the set points on the SLVL map, the determination threshold value SLVL is calculated by the interpolation.

In step S15, it is determined whether or not the fitting ratio PFIT calculated in step S13 is greater than the determination threshold value SLVL. If the answer to step S15 is affirmative (YES), it is determined that a knocking has occurred, and a knocking flag FKNOCK is set to "1" (step S16).

If PFIT is equal to or less than SLVL in step S15, it is determined that no knocking has occurred, and the knocking flag FKNOCK is set to "0" (step S17). Subsequently, the noise learning process shown in FIG. 16 is executed to update the noise map (refer to FIG. 5(a)).

FIG. 10 is a flowchart of the binarized data map calculation process which is executed in step S11 of FIG. 8.

In step S21, all of a crank angle index i, a frequency index j, and a memory address index k are initialized to "0". In step S22, it is determined whether or not the frequency index j is greater than a value obtained by subtracting "1" from a frequency data number JN (the number JN is "21" in this embodiment). Since the answer to step S22 is initially negative (NO), the process proceeds to step S23, in which it is determined whether or not the crank angle index i is greater than a value obtained by subtracting "1" from a crank angle data number IN (the number In is "15" in this embodiment).

Since the answer to step S23 is also initially negative (NO), the memory address index k is calculated by the following equation (1) (step S24). Therefore, the memory address index k changes from "0" to (JN×IN−1) with the increase in the crank angle index i and the frequency index j.

$$k = i + j \times IN \qquad (1)$$

In step S25, the intensity parameter KMAP(j,i) is set to a intensity value STFT[k] stored in the memory. In step S26, the binarizing process shown in FIG. 11 is executed. Next, the crank angle index i is incremented by "1" (step S27).

In step S31 of FIG. 11, a BLVL map shown in FIG. 12 is retrieved according to the engine rotational speed NE and the intake pressure PBA, to calculate a binarized threshold value BLVL. The BLVL map is set so that the binarized threshold value BLVL increases as the engine rotational speed NE increases, and the binarized threshold value BLVL also increases as the intake pressure PBA increases. The preset value shown by the line L1 is applied in a range from a first predetermined intake pressure PBA1 (i.e., 53 kPa (400 mmHg)) to a second predetermined intake pressure PBA2 (i.e., 80 kPa (600 mmHg)). The lines L2 and L3 respectively correspond to a third predetermined intake pressure PBA3 (i.e., 93 kPa (700 mmHg)) and a fourth predetermined intake pressure PBA4 (i.e., 107 kPa (800 mmHg)).

In step S32, it is determined whether or not the intensity parameter KMAP(j,i) is greater than the binarized threshold value BLVL. If the answer to step S32 is affirmative (YES), the binarized intensity parameter NKMAP(j,i) is set to "1" (step S33). On the other hand, if KMAP(j,i) is equal to or less than BLVL in step S32, the binarized intensity parameter NKMAP(j,i) is set to "0" (step S34).

Referring back to FIG. 10, while the answer to step S23 is negative (NO), steps S24 to S27 are repeatedly executed. If the crank angle index i exceeds (IN−1), the process proceeds to step S28, in which the crank angle index i is reset to "0" and the frequency index j is incremented by "1". Thereafter, the process returns to step S22.

While the answer to step S22 is negative (NO), steps S23 to S28 are repeatedly executed. If the frequency index j exceeds (JN−1), the process ends.

According to the process of FIG. 10, the intensity values STFT[k], which are obtained as a result of the frequency spectrum analysis and stored in the memory, are converted to a form of the time series spectrum map shown in FIG. 3(a), and the intensity parameter KMAP(j,i) is binarized to calculate the binarized intensity parameter NKMAP(j,i). That is, the binarized time series spectrum map shown in FIG. 3(b) is generated.

FIG. 13 is the flowchart of the noise removal process executed in step S12 of FIG. 8.

In step S41, both of the crank angle index i and the frequency index j are initialized to "0". In step S42, it is determined whether or not the frequency index j is greater than a value obtained by subtracting "1" from the frequency data number JN. Since the answer to step S42 is initially negative (NO), the process proceeds to step S43, in which it is determined whether or not the crank angle index i is greater than a value obtained by subtracting "1" from the crank angle data number IN.

Since the answer to step S43 is also initially negative (NO), the binarized intensity parameter NKMAP(j,i) is corrected by the following equation (2), to calculate a corrected binarized intensity parameter JKMAP(j,i). NNMAP(j,i) in the equation (2) is a binarized noise parameter on the noise map which is updated by the learning process.

$$JKMAP(j,i) = NKMAP(j,i) - NNMAP(j,i) \qquad (2)$$

In step S45, it is determined whether or not the corrected binarized intensity parameter JKMAP(j,i) is less than "0". If the answer to step S45 is negative (NO), the process immediately proceeds to step S47. If JKMAP(j,i) is less than "0", JKMAP(j,i) is set to "0" (step S46), and the process proceeds to step S47.

In step S47, the crank angle index i is incremented by "1" and the process returns to step S43. While the answer to step S43 is negative (NO), step S44 to S47 are repeatedly executed. If the crank angle index i exceeds (IN−1), the process proceeds to step S48, in which the crank angle index i is reset to "0" and the frequency index j is incremented by "1". Thereafter, the process returns to step S42. While the answer to step S42 is negative (NO), step S43 to S48 are repeatedly executed. If the frequency index j exceeds (JN−1), the process ends.

According to the process of FIG. 13, the corrected binarized intensity parameter JKMAP(j,i) from which the noise is removed is obtained (refer to FIG. 5(b)).

FIG. 14 is a flowchart of the fitting ratio calculation process executed in step S13 of FIG. 8.

In step S51, the master pattern map is selected according to the engine rotational speed NE and the intake pressure PBA. In step S52, the weighting map is selected according to the engine rotational speed NE and the intake pressure PBA. The weighting map is provided for compensating changes in the frequency-dependent characteristic of the binarized time series spectrum map, depending on the engine operating condition. If the engine rotational speed NE or the intake pressure PBA (engine load) changes, the temperature in the combustion chamber changes, which causes a change in the binarized time series spectrum map. Therefore, by selecting the master pattern map and the weighting map according to the engine rotational speed NE and the intake pressure PBA, the determination can be performed accurately regardless of the changes in the engine operating condition.

In this embodiment, as shown in FIG. 15, nine master pattern maps and nine weighting maps are previously set corresponding to nine engine operating regions defined by the engine rotational speed NE and the intake pressure PBA. In step S51, one of the nine master pattern maps is selected, and in step S52, one of the nine weighting maps is selected. In FIG. 15, the low engine speed region is a region where the engine rotational speed NE is equal to or less than 2000 rpm, for example, the medium engine speed region is a region where the engine rotational speed NE is in the range from 2000 rpm to 4000 rpm, and the high engine speed region is a region where the engine rotational speed is higher than 4000 rpm. Further, the low engine load region is a region where the intake pressure PBA is equal to or less than 67 kPa (500 mmHg), for example, the medium engine load region is a region where the intake pressure PBA is in the range from 67 kPa to 93 kPa (700 mmHg), and the high engine load region is a region where the intake pressure PBA is higher than 93 kPa.

In step S53, both of the crank angle index i and the frequency index j are initialized to "0", and the intensity integrated value SUMK and the reference integrated value SUMM are initialized to "0". The intensity integrated value SUMK and the reference integrated value SUMM are updated in step S57 described below, and are applied to the calculation of the fitting ratio PFIT in step S60.

In step S54, it is determined whether or not the frequency index j is greater than a value obtained by subtracting "1" from the frequency data number JN. Since the answer to step S54 is initially negative (NO), the process proceeds to step S55, in which it is determined whether or not the crank angle index i is greater than a value obtained by subtracting "1" from the crank angle data number IN.

Since the answer to step S55 is also initially negative (NO), the process proceeds to step S56, in which a weighting master parameter MMW and a weighting product parameter KMW are calculated by the following equations (3) and (4). WMAP(j,i) in the following equations is a weighting parameter which is set in the weighting map. The weighting product parameter KMW is obtained by weighting the product of the master parameter MMAP(j,i) and the corrected binarized intensity parameter JKMAP(j,i) with the weighting parameter WMAP(j,i).

$$MMW=MMAP(j,i) \times WMAP(j,i) \tag{3}$$

$$KMW=MMAP(j,i) \times JKMAP(j,i) \times WMAP(j,i) \tag{4}$$

In step S57, the weighting master parameter MMW and the weighting product parameter KMW are integrated with the following equations (5) and (6) to calculate a reference integrated value SUMM and an intensity integrated value SUMK.

$$SUMM=SUMM+MMW \tag{5}$$

$$SUMK=SUMK+KMW \tag{6}$$

In step S58, the crank angle index i is incremented by "1" and the process returns to step S55. While the answer to step S55 is negative (NO), steps S56 to S58 are repeatedly executed. If the crank angle index i exceeds (IN−1), the process proceeds to step S59, in which the crank angle index i is reset to "0" and the frequency index j is incremented by "1". Thereafter, the process returns to step S54. While the answer to step S54 is negative (NO), steps S55 to S59 are repeatedly executed. If the frequency index j exceeds (JN−1), the process proceeds to step S60, in which the fitting ratio PFIT is calculated by the following equation (7).

$$PFIT=SUMK/SUMM \tag{7}$$

FIG. 16 is the flowchart of the noise learning process executed in step S18 of FIG. 8.

In step S71, all of the crank angle index i, the frequency index j, an addition learning parameter LK, and a subtraction learning parameter LM are initialized to "0". In step S72, it is determined whether or not the frequency index j is greater than a value obtained by subtracting "1" from the frequency data number JN. Since the answer to step S72 is initially negative (NO), the process proceeds to step S73, in which it is determined whether or not the crank angle index i is greater than a value obtained by subtracting "1" from the crank angle data number IN.

Since the answer to step S73 is also initially negative (NO), the process proceeds to step S74, in which it is determined whether or not the binarized intensity parameter NKMAP(j,i) is equal to a binarized noise parameter NNMAP(j,i). If the answer to step S74 is affirmative (YES), the process immediately proceeds to step S80.

If the answer to step S74 is negative (NO), i.e., the binarized intensity parameter NKMAP(j,i) differs from the binarized noise parameter NNMAP(j,i), it is determined whether or not the binarized intensity parameter NKMAP(j,i) is greater than the binarized noise parameter NNMAP(j,i) (step S75). If the answer to step S75 is affirmative (YES), the addition learning parameter LK is set to "1" and the subtraction learning parameter LM is set to "0" (step S76). On the other hand, if NKMAP(j,i) is less than NNMAP(j,i), the addition learning parameter LK is set to "0" and the subtraction learning parameter LM is set to "1" (step S77).

In step S78, the addition learning parameter LK and the subtraction learning parameter LM are corrected with the following equations (8) and (9). DSNOISE in the equations (8) and (9) is a noise learning coefficient set to "0.1" for example.

$$LK=DSNOISE \times LK \tag{8}$$

$$LM=DSNOISE \times LM \tag{9}$$

In step S79, the addition learning parameter LK and the subtraction learning parameter LM are applied to the following equation (10), to update the noise parameter NMAP(j,i). In the process of FIG. 17 described below, the noise parameter NMAP(j,i) is binarized to calculate the binarized noise parameter NNMAP(j,i).

$$NMAP(j,i)=NMAP(j,i)+LK-LM \tag{10}$$

In step S80, the crank angle index i is incremented by "1" and the process returns to step S73. While the answer to step S73 is negative (NO), steps S74 to S80 are repeatedly executed. If the crank angle index i exceeds (IN−1), the process proceeds to step S81, in which the crank angle index i is reset to "0" and the frequency index j is incremented by "1". Thereafter, the process returns to step S72. While the answer to step S72 is negative (NO), steps S73 to S81 are repeatedly executed. If the frequency index j exceeds (JN−1), the process proceed to step S82, in which the noise map update process shown in FIG. 17 is executed.

In step S91 of FIG. 17, both of the crank angle index i and the frequency index j are initialized to "0". In step S92, it is determined whether or not the frequency index j is greater than a value obtained by subtracting "1" from the frequency data number JN. Since the answer to step S92 is initially negative (NO), the process proceeds to step S93, in which it is determined whether or not the crank angle index i is greater than a value obtained by subtracting "1" from the crank angle data number IN.

Since the answer to step S93 is also initially negative (NO), the process proceeds to step S94, in which it is determined whether or not the noise parameter NMAP(j,i) is greater than a noise binarized threshold value NLVL (e.g., 0.8). If the answer to step S94 is affirmative (YES), the binarized noise parameter NNMAP(j,i) is set to "1" (step S95). On the other hand, if NMAP(j,i) is equal to or less than NLVL, the binarized noise parameter NNMAP(j,i) is set to "0" (step S96).

In step S97, the crank angle index i is incremented by "1" and the process returns to step S93. While the answer to step S93 is negative (NO), steps S94 to S97 are repeatedly executed. If the crank angle index i exceeds (IN−1), the process proceeds to step S98, in which the crank angle index i is reset to "0" and the frequency index j is incremented by "1". Thereafter, the process returns to step S92. While the answer to step S92 is negative (NO), steps S93 to S98 are repeatedly executed. If the frequency index j exceeds (JN−1), the process ends.

If NKMAP(j,i) is greater than NNMAP(j,i) in step S75 of FIG. 16, LK is updated to "0.1" and LM is updated to "0" in step S78, and the noise parameter NMAP(j,i) is incremented by "0.1" with the equation (10). On the other hand, if NKMAP(j,i) is less than NNMAP(j,i) in step S75, LK is updated to "0" and LM is updated to "0.1" in step S78, and the noise parameter NMAP(j,i) is decremented by "0.1" with the equation (10). In the process of FIG. 17, when the noise parameter NMAP(j,i) is greater than the noise binarized threshold value NLVL, the binarized noise parameter NNMAP(j,i) is set to "1". On the other hand, when the noise parameter NMAP(j,i) is equal to or less than the noise binarized threshold value NLVL, the binarized noise parameter NNMAP(j,i) is set to "0".

By the processes of FIGS. 16 and 17, the noise map is updated according to the binarized intensity parameter NKMAP(j,i) which is obtained when it is determined that no knocking has occurred. The steadily-generated noise, such as the seating noise of the intake valve, is reflected on the noise map. Consequently, it is possible to accurately perform the determination without influence of the noise.

It is noted that the fitting ratio PFIT may be calculated using the binarized intensity parameter NKMAP itself without performing the noise removal process (FIG. 8, step S12). When not performing the noise removal process, the possibility of being influenced by the noises becomes comparatively high. However, the knocking can be determined distinctively from the noise as described with reference to FIG. 30.

As described above, in this embodiment, the Fast Fourier Transform operation (frequency spectrum analysis) of the output signal of the knock sensor 11 is performed at intervals of six degrees of the crank angle. Consequently, the time series data of the intensity of the frequency components from 5 kHz to 25 kHz are obtained, and the time series spectrum map is generated. That is, the elements of the time series spectrum map are stored in the memory as the intensity parameters KMAP(j,i) which are two-dimension array data. Subsequently, by binarizing the intensity parameter KMAP (j,i), the binarized intensity parameter NKMAP(j,i) is calculated, and it is determined whether or not a knocking has occurred based on the binarized intensity parameter NKMAP (j,i). The change in the frequency spectrum occurring with the engine rotation is reflected on the binarized intensity parameter NKMAP(j,i). Therefore, by comparing the binarized intensity parameter NKMAP(j,i) with the master parameter MMAP(j,i) on the master pattern map which corresponds to the changing pattern particular to occurrence of the knocking, occurrence of the knocking can be accurately determined. Further, by binarizing the intensity parameter KMAP(j,i) obtained as a result of the frequency spectrum analysis, the amount of data is reduced and the changing pattern of the time series data is simplified. Consequently, the memory capacity can be reduced and the computing speed can be raised.

Further, the possibility that a knocking has occurred is high when the binarized intensity parameter NKMAP(j,i)(JKMAP (j,i)) indicates a changing pattern similar to the master parameter MMAP(j,i). Therefore, by calculating a parameter which indicates the similarity (correlativity) between the binarized intensity parameter NKMAP(j,i)(JKMAP(j,i)) and the master parameter MMAP(j,i), the determination can be performed accurately.

In this embodiment, the fitting ratio PFIT is used as the parameter indicative of the similarity (correlativity), and it is determined that a knocking has occurred when the fitting ratio PFIT exceeds the determination threshold value SLVL. By using the fitting ratio PFIT, the similarity (correlativity) between the binarized intensity parameter NKMAP(j,i)(JKMAP(j,i)) and the master parameter MMAP(j,i) can be accurately estimated with comparatively easy calculation, and the determination can be performed accurately.

Further, the time series data NNMAP(j,i) of noise components are calculated based on the binarized intensity parameter NKMAP(j,i). The binarized intensity parameter NKMAP(j,i) is corrected by the noise parameter NNMAP(j, i), and the knocking determination is performed based on the corrected binarized intensity parameter JKMAP(j,i). Therefore, the noise components which steadily appear, e.g., the components included in the above-described valve seating noise, are removed to make it possible to accurately perform the determination.

Further, the fitting ratio PFIT is calculated using the parameters obtained by multiplying the binarized intensity parameter NKMAP(j,i)(JNKMAP (j,i)) and the master parameter MMAP (j,i) by the weighting parameter WMAP(j,i) set according to the frequency. The frequency components which become greater when a knocking has occurred are previously known. Therefore, by largely weighting the data corresponding to frequencies near the frequencies of the known frequency components, accuracy of the determination can be improved.

In this embodiment, the ECU 5 constitutes the knocking determining means, the frequency spectrum analyzing means, the data storing means, the binarizing means, the noise component calculating means, and the weighting means. Specifically, Second Embodiment In this embodiment, the knocking determination process (FIG. 8) in the first embodiment is changed to the process shown in FIG. 18. This embodiment is the same as the first embodiment except for the points described below.

In the process shown in FIG. 18, the noise removal process is first executed with respect to the intensity parameter KMAP before the binarization, to calculate a corrected intensity parameter JKMAPI (step S12a). Next, the corrected intensity parameter is binarized to calculate the corrected binarized intensity parameter JKMAP (step S11b).

FIG. 19(a) shows an example of the time series spectrum map in this embodiment, and FIG. 19(b) shows an example of the noise map in which noise learned values which are not binarized are set. The noise removal process is performed by subtracting the noise map value in FIG. 19(b) from each of the map values set in the time series spectrum map of FIG. 19(a), to generate the corrected time series spectrum map shown in FIG. 20(a). Subsequently, by binarizing the corrected time series spectrum map of FIG. 20(a), the corrected binarized intensity parameter map shown in FIG. 20(b) is obtained.

FIG. 21 is a flowchart of the data map calculation process executed in step S11a of FIG. 18. This process is obtained by deleting step S26 in the binarized data map calculation process shown in FIG. 10. That is, only the process in which the intensity values STFT(k) are converted to the configuration of the time series spectrum map, is performed.

FIG. 22 is a flowchart of the noise removal process executed in step S12a of FIG. 18. This process is obtained by changing steps S44 to S46 of the process shown in FIG. 13 respectively to steps 44a to 46a.

In step S44a, the corrected intensity parameter JKMAPI is calculated by the following equation (2a). NLMAP(j,i) in the equation (2a) is a noise parameter on the noise map (FIG. 19(b)) which is updated in the learning process.

$$JKMAPI(j,i)=KMAP(j,i)-NLMAP(j,i) \quad (2a)$$

In step S45a, it is determined whether or not the corrected intensity parameter JKMAPI(j,i) is less than "0". If the answer to step S45a is negative (NO), the process immediately proceeds to step S47. If JKMAPI(j,i) is less than "0", JKMAP(j,i) is set to "0" (step S46a) and the process proceeds to step S47.

According to the process of FIG. 22, the corrected time series spectrum map shown in FIG. 20(a) is obtained.

FIG. 23 is a flowchart of the binarizing process executed in step S11b of FIG. 18. This process is obtained by changing steps S32 to S34 in the binarizing process of FIG. 11 respectively to steps S32a to S34a, and adding steps S41 to S43, S47, and S48 (the steps for executing the same process executed by the steps shown in FIG. 22) for performing the binarization of all map values.

In step S32a, it is determined whether or not the corrected intensity parameter JKMAPI(j,i) is greater than the binarizing threshold value BLVL. If the answer to step S32a is negative (NO), the corrected binarized intensity parameter JKMAP(j,i) is set to "1" (step S33a). On the other hand, if JKMAPI(j,i) is equal to or less than BLVL, the corrected binarized intensity parameter JKMAP(j,i) is set to "0" (step 34a).

According to the process of FIG. 23, the corrected binarized intensity parameter map shown in FIG. 20(b) is obtained from the map shown in FIG. 20(a).

FIG. 24 is a flowchart of the noise learning process executed in step S18a of FIG. 18. This process is obtained by deleting steps S74 to S78 and S82 in the process shown in FIG. 16, and changing step S79 to step S79a.

In step S79a, the noise parameter NLMAP(j,i) is updated. Specifically, the intensity parameter KMAP(j,i) which is obtained when no knocking is detected, is applied to the following equation (31) to update the noise parameter NLMAP(j,i). The noise parameter NLMAP(j,i) on the right side of the equation (31) is a map value before being updated, and DSNOISEa is an averaging coefficient which is set, for example, to "0.5".

$$NLMAP(j,i)=NLMAP(j,i) \times DSNOISEa+KMAP(j,i) \times (1-DSNOISEa) \quad (31)$$

The averaging coefficient DSNOISEa in the equation (31) may be changed in the range from "0" to "1" according to the engine operating condition as described below.

1) The averaging coefficient DSNOISEa is changed to a less value, when the engine rotational speed NE rapidly rises (e.g., a difference (NE(m)−NE(m−1)) between the present value NE(m) and the preceding value NE(m−1) of the engine rotational speed is equal to or greater than 200 rpm). With this setting, the weighting of the present intensity parameter value KMAP(j,i) is increased to raise the learning speed of the noise parameter NLMAP(j,i). The parameter "m" is a discrete time digitized with the execution period of the process of FIG. 18.

2) The averaging coefficient DSNOISEa is changed to a less value, when the opening timing CAI of the intake valve rapidly changes (e.g., the absolute value of a difference between the present value CAI(m) and the preceding value CAI(m−1) of the opening timing is equal to or greater than "5" degrees).

3) The averaging coefficient DSNOISEa is changed to a less value, when the lift amount LFT of the intake valve rapidly changes (e.g., the absolute value of a difference between the present value LFT(m) and the preceding value LFT(m−1) of the lift amount is equal to or greater than "0.5" millimeters).

According to this embodiment, the map value (NLMAP) of the noise map is updated using the intensity parameter KMAP before being binarized. Therefore, the noise parameter NLMAP(j,i) can be calculated more accurately compared with the first embodiment.

In this embodiment, step S11a of FIG. 18 corresponds to the data storing means, step S12a corresponds to the noise correcting means, step 18a corresponds to the noise component calculating means, step S11b corresponds to the binarizing means, and steps S13 to S17 correspond to the knocking determining means.

Third Embodiment

In this embodiment, "21" frequencies from 5 kHz to 25 kHz are divided (grouped) to "7" frequency groups G1 to G7 consisting of three frequencies, and group intensity parameters GKMAP are set to the maximum value of the intensity parameters KMAP in the same frequency group. The group intensity parameter GKMAP is a representative value of the intensity parameters KMAP corresponding to one sampling timing. By first performing the grouping, the number of data to be processed in the noise removal process, the binarizing process, and the fitting ratio parameter calculation process is reduced to one third, to make it possible to greatly reduce the calculation load. This embodiment is the same as the second embodiment except for the points described below.

FIG. 25 is a diagram for illustrating the grouping. Frequencies of 5, 6, and 7 kHz correspond to the frequency group G1, frequencies of 8, 9, and 10 kHz correspond to the frequency group G2, frequencies of 11, 12, and 13 kHz correspond to the frequency group G3, frequencies of 14, 15, and 16 kHz correspond to the frequency group G4, frequencies of 17, 18, and 19 kHz correspond to the frequency group G5, frequencies of 20, 21, and 22 kHz correspond to the frequency group G6, and frequencies of 23, 24, and 25 kHz correspond to the frequency group G7. The maximum value in each group at each sampling timing (sampling crank angle) is indicated with hatching. By extracting the maximum value, the grouped time series spectrum map shown in FIG. 25(b) is obtained.

In this embodiment, the knocking determination is performed using the time series spectrum map shown in FIG. 25(b). The set value in the time series spectrum map shown in FIG. 25(b) is hereinafter referred to as "group intensity parameter GKMAP(n,i)". The parameter "n" is an index parameter indicative of the frequency group, and takes values from "0" to "6" corresponding to the frequency groups G1 to G7.

FIG. 26(a) shows the same map as that in FIG. 25(b), and FIG. 26(b) shows the noise map which is obtained by the learning process described in the second embodiment. The set value in the noise map shown in FIG. 26(b) is hereinafter referred to as "group noise parameter GNLMAP(n,i)".

By subtracting the group noise parameter GNLMAP(n,i) from the group intensity parameter GKMAP(n,i), a corrected group intensity parameter GJKMAPI(n,i) is calculated. FIG. 26(c) shows the time series spectrum map in which the corrected group intensity parameters GJKMAPI(n,i) are set.

Further, a binarized corrected group intensity parameter GJKMAP(n,i) is calculated by binarizing the corrected group intensity parameter GJKMAPI(n,i). FIG. 26(d) shows a time series spectrum map in which the binarized corrected group intensity parameters GJKMAP(n,i) are set. The master pattern map is given by a map shown in FIG. 26(e), for example.

The knocking determination according to the fitting ratio PFIT which is calculated based on the binarized corrected group intensity parameters GJKMAP and the master pattern map of FIG. 26(e), can be performed similarly as the above-described embodiments.

FIG. 27 is a flowchart of the knocking determination process in this embodiment. This process is obtained by adding step S100 for executing the grouping process to the process shown in FIG. 18, and changing steps S12a, S11b, S13 to S17, and S18a respectively to steps S101 to S108.

The difference between the process of steps 101 to S103 and S108 and the process of corresponding steps in FIG. 18 is that the number of lines in the map to be processed is not "21" but "7". Therefore, detailed description of the process of FIG. 27 is omitted.

FIG. 28 is a flowchart of the grouping process executed in step 100 of FIG. 27.

In step S111, all of the crank angle index i, the frequency index j, and the group index n are reset to "0". In step S112, it is determined whether or not the frequency index j is greater than a value obtained by subtracting "1" from the frequency data number JN. Since the answer to step S112 is initially negative (NO), the process proceeds to step S113, in which it is determined whether or not the crank angle index i is greater than a value obtained by subtracting "1" from the crank angle data number IN.

Since the answer to step S113 is initially negative (NO), the process proceeds to step S114, in which parameters a, b, and c are set respectively to the intensity parameters KMAP(j,i), KMAP(j+1,i), and KMAP(j+2,i) which are map values consecutive in the frequency direction. In step S115, the group intensity parameter GKMAP(n,i) is set to the maximum value of the parameters a, b, and c.

In step S116, the crank angle index i is incremented by "1", and the process returns to step S113. While the answer to step S113 is negative (NO), steps S114 to S116 are repeatedly executed. If the crank angle index i exceeds (IN−1), the process proceeds to step S117, in which the crank angle index i is reset to "0", and the frequency index j is incremented by "3". Thereafter, the process returns to step S112. While the answer to step S112 is negative (NO), steps S113 to S117 are repeatedly executed. If the frequency index j exceeds (JN−1), the process ends.

According to the process of FIG. 28, the time series spectrum map (FIG. 25(b)) in which the group intensity parameters GKMAP(n,i) are set, is obtained.

According to this embodiment, the noise removal process, the binarizing process, and the fitting ratio calculating process are executed with respect to the group intensity parameter GKMAP. Therefore, the number of data to be processed decreases to make it possible to reduce the calculation load on the CPU.

In this embodiment, the process of FIG. 28 corresponds to the frequency group time series data generating means, step S108 of FIG. 27 corresponds to the group noise component calculating means, and step S101 corresponds to the group noise correcting means.

The present invention is not limited to the embodiment described above, and various modifications may be made. For example, the sampling period of the knock sensor output and the crank angle interval of the frequency spectrum analysis is not limited to the above-described time period and angular interval (20 microseconds, 6 degrees). The time period and/or the angular interval can be changed within the range in which the object of the present invention is attained. Further, the configuration of the binarized time series spectrum map (which is configured in the form of the matrix of 21 lines×15 columns in the described-above embodiment) can be changed similarly.

Further, in the above-described first embodiment, the fitting ratio PFIT is calculated using the parameters obtained by multiplying the corrected binarized intensity parameter JNKMAP (j,i) and the master parameter MMAP (j,i) by the weighting parameter WMAP(j,i). Alternatively, the fitting ratio PFIT may be calculated with the corrected binarized intensity parameter JNKMAP (j,i) and the master parameter MMAP (j,i) without multiplying the weighting parameter WMAP(j,i), i.e., without performing the weighting.

Further, in the above-described embodiments, the determination threshold value SLVL, the binarized threshold value BLVL, the master pattern map, and the weighting map are calculated or selected according to the engine rotational speed NE and the intake pressure PBA. Alternatively, the determination threshold value SLVL, the binarized threshold value BLVL, the master pattern map, and/or the weighting map are fixed to a previously set value or one map.

Further, the fitting ratio PFIT may be calculated by the process shown in FIG. 29. The process shown in FIG. 29 is obtained by replacing steps S53, S56, S57, and S60 of FIG. 14 respectively with steps S53a, S56a, S57a, S57b, and S60a.

In step S53a, the crank angle index i and the frequency index j are initialized to "0", and the intensity integrated value SUMKa and the reference integrated value SUMMa are initialized to "0".

In step S56a, it is determined whether or not the corrected binarized intensity parameter JKMAP(j,i) is equal to the corresponding master parameter MMAP(j,i). If the answer to step S56a is affirmative (YES), the intensity integrated value SUMKa is updated by the following equation (11) (step S57a).

$$SUMKa=SUMKa+WMAP(j,i) \quad (11)$$

If JKMAP (j,i) is not equal to the corresponding master parameter MMAP(j,i) in step S56a, the process immediately proceeds to step S57b.

In step S57b, the reference integrated value SUMMa is updated by the following equation (12).

$$SUMMa = SUMMa + WMAP(j,i) \quad (12)$$

In step S60a, the intensity integrated value SUMKa and the reference integrated value SUMMa are applied to the following equation (13), to calculate the fitting ratio PFIT.

$$PFIT = SUMKa/SUMMa \quad (13)$$

The fitting ratio PFIT calculated by the process of FIG. 29 also becomes greater as the similarity (correlativity) between the corrected binarized intensity parameter JKMAP(j,i) and the master parameter MMAP(j,i) is higher. Consequently, the fitting ratio PFIT calculated by the process of FIG. 29 can also be used as a parameter indicative of the similarity (correlativity).

Further, in the above-described embodiments, the fitting ratio PFIT is used as a parameter indicative of the similarity (correlativity) between the corrected binarized intensity parameter JKMAP(j,i) and the master parameter MMAP(j,i). Alternatively, for example, a difference integrated value SUMDIF, which is a sum of the absolute values of the difference between the corrected binarized intensity parameter JKMAP(j,i) and the master parameter MMAP(j,i), may be used. The difference integrated value SUMDIF is calculated by the following equation (21),

[Eq. 1]

$$SUMDIF = \sum_{i=0}^{IN-1} \sum_{j=0}^{JN-1} |JKMAP(j,i) - MMAP(j,i)| \quad (21)$$

The difference integrated value SUMDIF indicates higher similarity (correlativity) as the difference integrated value SUMDIF becomes smaller. Consequently, when the difference integrated value SUMDIF is less than a difference determination threshold value SDLVL, it is determined that a knocking has occurred.

Further, in the above-described third embodiment, the corrected group intensity parameter GJKMAPI is calculated by correcting the group intensity parameter GKMAP with the group noise parameter GNLMAP, and the binarized corrected group intensity parameter GJKMAP is calculated by binarizing the corrected group intensity parameter GJKMAPI. Alternatively, a binarized group intensity parameter GNKMAP may be calculated by binarizing the group intensity parameter GKMAP, and the binarized corrected group intensity parameter GJKMAP may be calculated by correcting the binarized group intensity parameter GNKMAP with a binarized group noise parameter NNMAP, similarly as the first embodiment.

Further, in the above-described embodiment, the knocking determination is always performed. Alternatively, it may be determined whether or not one or more cylinder (referred to as "cylinder CYLXK") in which the knocking hardly occurs exists, and the knocking determination may not be performed with respect to such cylinder CYLXK if the cylinder(s) CYLXK exist(s). According to this method, the calculation load of the knocking determination can be reduced.

The selection of the cylinder CYLXK is performed as follows, for example. The knocking determination is first performed with respect to all cylinders in the operating condition wherein the engine rotational speed NE is comparatively low, and a retarding correction value IGKNOCK of the ignition timing is calculated with respect to each cylinder. Next, the cylinder(s) wherein the minimum value of the retarding correction value IGKNOCK is less than a predetermined threshold value, is(are) selected as the cylinder(s) CYLXK. Then, the knocking determination with respect to the cylinder(s) CYLXK is stopped in the high rotational speed region wherein the engine rotational speed NE is comparatively high. The retarding correction value IGKNOCK of the ignition timing is calculated by adding a first predetermined amount when a knocking is detected, and gradually reducing when no knocking is detected (this calculation method is shown, for example, in Japanese Patent Laid-open No. 2004-353473).

Further, the present invention can be applied also to a knocking detection for a water propulsion engine such as an outboard engine having a vertically extending crankshaft.

The invention claimed is:

1. A knocking detecting apparatus for an internal combustion engine having knocking determining means for performing a knocking determination based on an output signal of a knock sensor mounted on said engine, said knocking detecting apparatus comprising:
   frequency spectrum analyzing means for performing a frequency spectrum analysis of the knock sensor output signal at predetermined angular intervals of the crankshaft rotation angle of said engine;
   data storing means for storing intensities of a plurality of frequency components obtained by the frequency spectrum analysis as time series data; and
   binarizing means for binarizing the time series data of the frequency component intensity;
   wherein said knocking determining means determines whether or not a knocking has occurred based on the binarized time series data.

2. A knocking detecting apparatus according to claim 1, wherein said knocking determining means performs the knocking determination by comparing the binarized time series data with a master pattern data corresponding to a state where a knocking has occurred.

3. A knocking detecting apparatus according to claim 2, wherein said knocking determining means includes:
   noise component calculating means for calculating time series data of noise components based on the binarized time series data; and
   noise correcting means for correcting the binarized time series data with the time series data of noise components,
   wherein said knocking determining means performs the knocking determination based on the corrected time series data.

4. A knocking detecting apparatus according to claim 2, further comprising:
   noise component calculating means for calculating time series data of noise components based on the time series data of the frequency component intensity; and
   noise correcting means for correcting the time series data of the frequency component intensity with the time series data of noise components,
   wherein said binarizing means binarizes the corrected time series data of the frequency component intensity.

5. A knocking detecting apparatus according to claim 2, wherein said knocking determining means includes weighting means for performing a weighting of the binarized time series data and the master pattern data according to a frequency of the frequency component, and
   said knocking determining means performs the knocking determination using the weighted time series data and the weighted master pattern data.

6. A knocking detecting apparatus according to claim 2, wherein said knocking determining means calculates a fitting ratio of the binarized time series data with respect to the master pattern data, and determines that a knocking has occurred when the fitting ratio exceeds a determination threshold value.

7. A knocking detecting apparatus according to claim 2, wherein the master pattern data are set according to an operating condition of said engine.

8. A knocking detecting apparatus according to claim 1, further comprising frequency group time series data generating means for generating frequency group time series data by selecting a maximum strength at one sampling timing with respect to each of frequency groups consisting of a plurality of frequencies,
wherein said binarizing means binarizes the frequency group time series data.

9. A knocking detecting apparatus according to claim 8, further comprising:
group noise component calculating means for calculating time series data of group noise components corresponding to each of the frequency groups based on the frequency group time series data; and
group noise correcting means for correcting the frequency group time series data with the time series data of group noise components,
wherein said binarizing means binarizes the corrected frequency group time series data.

10. A knocking detecting method for an internal combustion engine, which performs a knocking determination based on an output signal of a knock sensor mounted on said engine, said knocking detecting method comprising the steps of:
a) performing a frequency spectrum analysis of the knock sensor output signal at predetermined angular intervals of the crankshaft rotation angle of said engine;
b) storing intensities of a plurality of frequency components obtained by the frequency spectrum analysis as time series data;
c) binarizing the time series data of the frequency component intensity; and
d) determining whether or not a knocking has occurred based on the binarized time series data.

11. A knocking detecting method according to claim 10, wherein the knocking determination is performed in said step d) by comparing the binarized time series data with a master pattern data corresponding to a state where a knocking has occurred.

12. A knocking detecting method according to claim 11, wherein said step d) includes the steps of:
e) calculating time series data of noise components based on the binarized time series data;
f) correcting the binarized time series data with the time series data of noise components; and
g) performing the knocking determination based on the corrected time series data.

13. A knocking detecting method according to claim 11, further comprising the steps of:
e') calculating time series data of noise components based on the time series data of the frequency component intensity; and
f') correcting the time series data of the frequency component intensity with the time series data of noise components,
wherein the corrected time series data of the frequency component intensity are binarized in said step c).

14. A knocking detecting method according to claim 11, wherein said step d) includes the step of h) performing a weighting of the binarized time series data and the master pattern data according to a frequency of the frequency component, and
the knocking determination is performed using the weighted time series data and the weighted master pattern data.

15. A knocking detecting method according to claim 11, wherein said step d) includes the step of i) calculating a fitting ratio of the binarized time series data with respect to the master pattern data, and it is determined that a knocking has occurred when the fitting ratio exceeds a determination threshold value.

16. A knocking detecting method according to claim 11, wherein the master pattern data are set according to an operating condition of said engine.

17. A knocking detecting method according to claim 10, further comprising the step of j) generating frequency group time series data by selecting a maximum strength at one sampling timing with respect to each of frequency groups consisting of a plurality of frequencies,
wherein the frequency group time series data are binarized in said step c).

18. A knocking detecting method according to claim 17, further comprising the steps of:
k) calculating time series data of group noise components corresponding to each of the frequency groups based on the frequency group time series data; and
l) correcting the frequency group time series data with the time series data of group noise components,
wherein the corrected frequency group time series data is binarized in said step c).

19. A computer program embodied on a computer-readable medium for causing a computer to implement a knocking detecting method for an internal combustion engine, which performs a knocking determination based on an output signal of a knock sensor mounted on said engine, said knocking detecting method comprising the steps of:
a) performing a frequency spectrum analysis of the knock sensor output signal at predetermined angular intervals of the crankshaft rotation angle of said engine;
b) storing intensities of a plurality of frequency components obtained by the frequency spectrum analysis as time series data;
c) binarizing the time series data of the frequency component intensity; and
d) determining whether or not a knocking has occurred based on the binarized time series data.

20. A computer program according to claim 19, wherein the knocking determination is performed in said step d) by comparing the binarized time series data with a master pattern data corresponding to a state where a knocking has occurred.

21. A computer program according to claim 20, wherein said step d) includes the steps of:
e) calculating time series data of noise components based on the binarized time series data;
f) correcting the binarized time series data with the time series data of noise components; and
g) performing the knocking determination based on the corrected time series data.

22. A computer program according to claim 20, wherein said knocking detecting method further comprises the steps of:
e') calculating time series data of noise components based on the time series data of the frequency component intensity; and f) correcting the time series data of the frequency component intensity with the time series data of noise components, wherein the corrected time series data of the frequency component intensity are binarized in said step c).

23. A computer program according to claim 20, wherein said step d) includes the step of h) performing a weighting of the binarized time series data and the master pattern data according to a frequency of the frequency component, and the knocking determination is performed using the weighted time series data and the weighted master pattern data.

24. A computer program according to claim 20, wherein said step d) includes the step of i) calculating a fitting ratio of the binarized time series data with respect to the master pattern data, and it is determined that a knocking has occurred when the fitting ratio exceeds a determination threshold value.

25. A computer program according to claim 20, wherein the master pattern data are set according to an operating condition of said engine.

26. A computer program according to claim 19, wherein said knocking detecting method further comprises the step of j) generating frequency group time series data by selecting a maximum strength at one sampling timing with respect to each of frequency groups consisting of a plurality of frequencies, wherein the frequency group time series data are binarized in said step c).

27. A computer program according to claim 26, wherein said knocking detecting method further comprises the steps of:

k) calculating time series data of group noise components corresponding to each of the frequency groups based on the frequency group time series data; and l) correcting the frequency group time series data with the time series data of group noise components, wherein the corrected frequency group time series data is binarized in said step c).

* * * * *